US 8,472,441 B2

(12) United States Patent
Karuppiah

(10) Patent No.: US 8,472,441 B2
(45) Date of Patent: Jun. 25, 2013

(54) MULTICAST COMMUNICATION APPARATUS AND METHOD FOR RECEIVING AND FORWARDING DATA VIA A NETWORK AMONG A PLURALITY OF NODES

(75) Inventor: Ettikan Kandasamy Karuppiah, Cyberjaya (MY)

(73) Assignee: Panasonic Corporation, Osaka (JP)

( * ) Notice: Subject to any disclaimer, the term of this patent is extended or adjusted under 35 U.S.C. 154(b) by 731 days.

(21) Appl. No.: 12/645,559

(22) Filed: Dec. 23, 2009

(65) Prior Publication Data

US 2010/0238925 A1 Sep. 23, 2010

Related U.S. Application Data

(60) Provisional application No. 61/161,183, filed on Mar. 18, 2009.

(51) Int. Cl.
*H04L 12/28* (2006.01)
(52) U.S. Cl.
USPC ........................................................ 370/390
(58) Field of Classification Search
None
See application file for complete search history.

(56) References Cited

U.S. PATENT DOCUMENTS

| | | | |
|---|---|---|---|
| 7,325,071 B2 | 1/2008 | Krishnan | |
| 7,349,343 B2 | 3/2008 | Shipman | |
| 7,379,450 B2 * | 5/2008 | Gu et al. | 370/352 |
| 2003/0174652 A1 | 9/2003 | Ebata | |
| 2003/0191797 A1 * | 10/2003 | Gurevich et al. | 709/200 |
| 2003/0223562 A1 | 12/2003 | Cui et al. | |
| 2004/0103149 A1 * | 5/2004 | Tanigawa et al. | 709/204 |
| 2006/0056427 A1 | 3/2006 | Sato | |
| 2006/0187860 A1 | 8/2006 | Li | |
| 2007/0121632 A1 | 5/2007 | Zabarski | |
| 2008/0172463 A1 | 7/2008 | Qin et al. | |
| 2008/0279101 A1 * | 11/2008 | Wu et al. | 370/235 |
| 2010/0146055 A1 * | 6/2010 | Hannuksela | 709/206 |
| 2011/0002333 A1 | 1/2011 | Karuppiah et al. | |

FOREIGN PATENT DOCUMENTS

| | | |
|---|---|---|
| EP | 1696630 | 8/2006 |
| JP | 2009-213120 | 9/2009 |
| KR | 10-0733828 | 6/2007 |
| WO | 2009/098748 | 8/2009 |

OTHER PUBLICATIONS

W. Xiaotao, K.D. Krishna, and K. Venkatesh, "Enhancing Application-Layer Multicast for P2P Conferencing", Consumer Communications and Networking Conference, 2007, 4th IEEE, Jan. 2007, p. 986-990.

(Continued)

*Primary Examiner* — Dang Ton
*Assistant Examiner* — Ronald H Davis
(74) *Attorney, Agent, or Firm* — Greenblum & Bernstein, P.L.C.

(57) ABSTRACT

A multicast communication apparatus for receiving and forwarding data via a network among a plurality of nodes. The apparatus has: a receiving section that receives the data from a source node; a routing table that stores route information of the data including the source node and a destination node of the data; a forwarding section that forwards the data to a next destination node according to the route information of the routing table; a hop length table that includes a hopping number of the data forwarded from the source node to the next destination node; and a mixing processing section that performs mixing processing of data received from another node. The mixing processing section performs the mixing processing according to the hopping number in the hop length table.

15 Claims, 30 Drawing Sheets

OTHER PUBLICATIONS

W. Xiaotao, K.D. Krishna, and K. Venkatesh, "Enhancing Application-Layer Multicast for P2P Conferencing," Consumer Communications and Networking Conference, 2007, 4th IEEE, Jan. 2007, p. 986-990.

Amad M. et al., "A Scalable based Multicast Model for P2P Conferencing Applications," Oct. 12, 2009, Ultra Modern Telecommunications & Workshops, 2009, ICUMT '09, International Conference on, IEEE, Piscataway, NJ, USA, pp. 1-6, XP031574476.

Japanese Patent Application No. 2008-306671 dated Dec. 1, 2008.

* cited by examiner

| Tree Source/Next Destination Node Address | IP # A | IP # B | IP # C | IP # D | IP # .. |
|---|---|---|---|---|---|
| IP # A | 0 | 0 | 1 | 1 | .. |
| IP # B | 1 | 0 | 0 | 0 | .. |
| IP # C | 2 | 0 | 0 | 1 | .. |
| IP # D | 0 | 0 | 0 | 0 | .. |
| IP # .. | .. | .. | .. | .. | .. |
| Mixing Status | F | X | M | M | M/F/X |
| Leaf / Non-Leaf | NL | NL | L | L | L/NL |

Mixing-Hop-Length (MHL) Table

FIG.7

| Self Node Address | Tree Source | Next Destination Address | Final Mixing Status |
|---|---|---|---|
| IP # B | IP # A | IP # C | MF |
| | IP # B | IP # D | MF |
| | IP # C | IP # A | F |
| | IP # D | IP # A | F |
| | | IP # D | MF |
| | IP # .. | – | X |
| | | IP # .. | .. |
| | | IP # .. | .. |

Decentralized ALM Mixing State (DAMS) Table

FIG. 8

| Node | Next Dest |
|---|---|
| A | B |
| B | C |
|   | D |
| C | - |
| D | - |

| Node | Next Dest |
|---|---|
| B | C |
|   | D |
| A | - |
| C | - |
| D | A |

| Node | Next Dest |
|---|---|
| C | B |
| A | - |
| B | D |
| D | A |

| Node | Next Dest |
|---|---|
| D | A |
|   | B |
|   | C |
| A | - |
| B | - |
| C | - |

FIG.12B

Node A

|   | A | B | C | D |
|---|---|---|---|---|
| A | - | 0 |   |   |
| B |   | - |   |   |
| C |   |   | - |   |
| D |   |   |   | - |
| Mixing Status | X | MF | X | X |
|   |   |   |   |   |
| Leaf/Non-Leaf | NL | L | NL | NL |

Node B

|   | A | B | C | D |
|---|---|---|---|---|
| A | - |   | 1 | 1 |
| B |   | - | 0 | 0 |
| C |   |   | - | 1 |
| D |   |   |   | - |
| Mixing Status | X | X | MF | F |
|   |   |   |   |   |
| Leaf/Non-Leaf | NL | NL | L | NL |

Node C

|  | A | B | C | D |
|---|---|---|---|---|
| A | – |  |  |  |
| B |  | – |  |  |
| C |  | 0 | – |  |
| D |  |  |  | – |
| Mixing Status | X | MF | X | X |
|  |  |  |  |  |
| Leaf/Non-Leaf | NL | L | NL | NL |

FIG.13C

Node D

|  | A (C3) | B | C | D |
|---|---|---|---|---|
| A | – |  |  |  |
| B | 1 | – |  |  |
| C | 2 |  | – |  |
| D | 0 | 0 | 0 | – |
| Mixing Status | F | MF | MF | X |
|  |  |  |  |  |
| Leaf/Non-Leaf | NL | L | L | NL |

FIG.13D

Node A

|   | A | B | C | D | E |
|---|---|---|---|---|---|
| A | – | 0 |   |   |   |
| B |   | – |   |   | 1 |
| C |   |   | – |   |   |
| D |   |   |   | – |   |
| E |   |   |   |   | – |
| Mixing Status | X | MF | X | X | MF |

FIG.15A

Node B

|   | A | B | C | D | E |
|---|---|---|---|---|---|
| A | – |   | 1 |   |   |
| B | 0 | – |   |   |   |
| C |   |   | – |   |   |
| D |   |   |   | – |   |
| E |   |   |   |   | – |
| Mixing Status | MF | X | MF | X | X |

FIG.15B

Node C

|   | A | B | C | D | E |
|---|---|---|---|---|---|
| A | – |   |   | 2 |   |
| B |   | – |   |   |   |
| C | 0 | 0 | – | 0 | 0 |
| D |   | 1 |   | – |   |
| E |   |   |   |   | – |
| Mixing Status | MF | MF | X | MF | MF |

FIG.15C

Node D

|  | A | B | C | D | E |
|---|---|---|---|---|---|
| A | - |  |  |  | 3 |
| B |  | - | 3 |  |  |
| C |  |  | - |  |  |
| D | 0 |  | 0 | - | 0 |
| E |  |  | 1 |  | - |
| Mixing Status | MF | X | F | X | MF |

FIG.15D

Node E

|  | A | B | C | D | E |
|---|---|---|---|---|---|
| A | - |  |  |  |  |
| B |  | - |  | 2 |  |
| C |  |  | - |  |  |
| D |  |  |  | - |  |
| E | 0 | 0 |  | 0 | - |
| Mixing Status | MF | MF | X | MF | X |

FIG.15E

Node A

|  | A | B | C | D | E |
|---|---|---|---|---|---|
| A | - |  |  |  | 0 |
| B |  | - |  |  | 1 |
| C |  |  | - |  | 2 |
| D |  | 1 |  | - | 1 |
| E |  |  |  |  | - |
| Mixing Status | X | MF | X | X | F |

FIG.17A

Node B

|  | A | B | C | D | E |
|---|---|---|---|---|---|
| A | - |  |  |  |  |
| B | 0 | - |  |  |  |
| C | 1 |  | - |  |  |
| D |  |  |  | - |  |
| E |  |  |  |  | - |
| Mixing Status | MF | X | X | X | X |

FIG.17B

Node C

|  | A | B | C | D | E |
|---|---|---|---|---|---|
| A | - |  |  |  |  |
| B |  | - |  |  |  |
| C | 0 | 0 | - |  |  |
| D |  |  |  | - |  |
| E | 2 | 2 |  |  | - |
| Mixing Status | MF | MF | X | X | X |

FIG.17C

Node D

|   | A | B | C | D | E |
|---|---|---|---|---|---|
| A | - | 2 | 2 |   |   |
| B |   | - | 3 |   |   |
| C |   |   | - |   |   |
| D | 0 |   | 0 | - |   |
| E |   |   | 0 |   | - |
| Mixing Status | MF | MF | F | X | X |

FIG.17D

Node E

|   | A | B | C | D | E |
|---|---|---|---|---|---|
| A | - |   |   | 1 |   |
| B |   | - |   | 2 |   |
| C |   |   | - | 3 |   |
| D |   |   |   | - |   |
| E |   |   |   | 0 | - |
| Mixing Status | X | X | X | F | X |

FIG.17E

MULTICAST COMMUNICATION APPARATUS AND METHOD FOR RECEIVING AND FORWARDING DATA VIA A NETWORK AMONG A PLURALITY OF NODES

CROSS REFERENCE TO RELATED APPLICATIONS

This application is entitled to the benefit of U.S. provisional application No. 61/161,183, filed on Mar. 18, 2009, the disclosure of which is incorporated herein by reference in its entirety.

BACKGROUND OF THE INVENTION (1) Field of the Invention

This invention relates to a multicast communication apparatus and method with network routing, and more particularly to a data mixing method and apparatus using dynamic application layer multicast, particularly but not exclusively for use in audio conferencing and video conferencing systems (in particular, "video conferencing" is also called "Audio and Visual (AV) conferencing" or "television (TV) conferencing".

(2) Description of Related Art

Application Layer Multicasting (ALM) is implemented on top of existing unicast network architecture for multiple nodes connectivity. ALM allows AV packet routing by the members themselves utilizing an overlay network which is formed by the ALM nodes without any additional router configuration, unlike multicast. ALM nodes exchange route information among them to form an overlay network and exchange packets utilizing this overlay network. This provides the flexibility of real-time and delay sensitive AV packet forwarding at application layer by a large number of multicast groups.

ALM can be used, for example, for a large group of audio conferencing sessions where decentralized mixing can be performed by Multi-point Control Unit (MCU) nodes for the participating nodes. These MCU nodes in turn can re-route the mixed content among them on best ALM path for minimal delay to realize a real-time audio conferencing. The ALM path can carry original audio content or partially mixed audio content to achieve minimal delay and load distribution along the MCU node paths. Minimal delay is achieved via best ALM path selection, while load distribution is done via incremental mixing of source audio content by the ALM-MCU node that mixes the audio content and delivers to the next ALM-MCU or another ALM or end audio node.

If MCU node mixes all audio packets without knowing the content or the source of the content, it might cause an audio echo problem since the duplicated audio content from the same source might be received in partially mixed or original form.

In W. Xiaotao, K. D. Krishna, and K. Venkatesh, "Enhancing application-Layer Multicast for P2P Conferencing", Consumer Communications and Networking Conference, 2007, 4th IEEE, January 2007, pages 986-990, a hybrid ALM-based P2P conferencing architecture that can take advantage of participating peers with different capabilities for an audio conferencing session is described.

This architecture uses a three-step algorithm to construct such a hybrid ALM-based P2P conference. This approach is more scalable than the existing ALM-based P2P conferencing systems. However, this approach does not consider audio loop problem (i.e. audio echo problem) if the same node were to perform mixing and bridging functions.

BRIEF SUMMARY OF THE INVENTION

It is therefore an object of the present invention to provide a multicast communication apparatus and method capable of reducing echo due to dynamic ALM path adaptation.

The present invention provides a multicast communication apparatus for receiving and forwarding data via a network among a plurality of nodes. The apparatus has: a receiving section that receives the data from a source node; a routing table that stores route information of the data including the source node and a destination node of the data; a forwarding section that forwards the data to a next destination node according to the route information of the routing table; a hop length table that includes a hopping number of the data forwarded from the source node to the next destination node; and a mixing processing section that performs mixing processing of data received from another node. The mixing processing section performs the mixing processing according to the hopping number in the hop length table.

BRIEF DESCRIPTION OF THE DRAWINGS

FIGS. 4A to 4D illustrate content of four sub-forwarding tables which are concatenated in FIG. 2 and in which four nodes A to D shown in FIG. 3 are the transmission sources;

FIG. 7 illustrates a Mixing Hop Length (MHL) table according to the embodiment of the present invention;

FIG. 8 illustrates a Decentralized ALM Mixing State (DAMS) table according to the embodiment of the present invention;

FIGS. 12A and 12B show routings in an explanatory case with four nodes according to the embodiment of the present invention;

FIGS. 13A to 13D show MHL tables that are created by nodes A to D according to a prescribed rule, in routings of FIGS. 12A to 12B;

FIGS. 15A to 15E show MHL tables that are created by nodes A to E according to the prescribed rule, in routings of FIGS. 14A to 14B;

FIGS. 17A to 17E show MHL tables that are created by nodes A to E according to the prescribed rule, in routings of FIGS. 16A to 16B;

DETAILED DESCRIPTION OF PREFERRED EMBODIMENTS

Figure 1A:
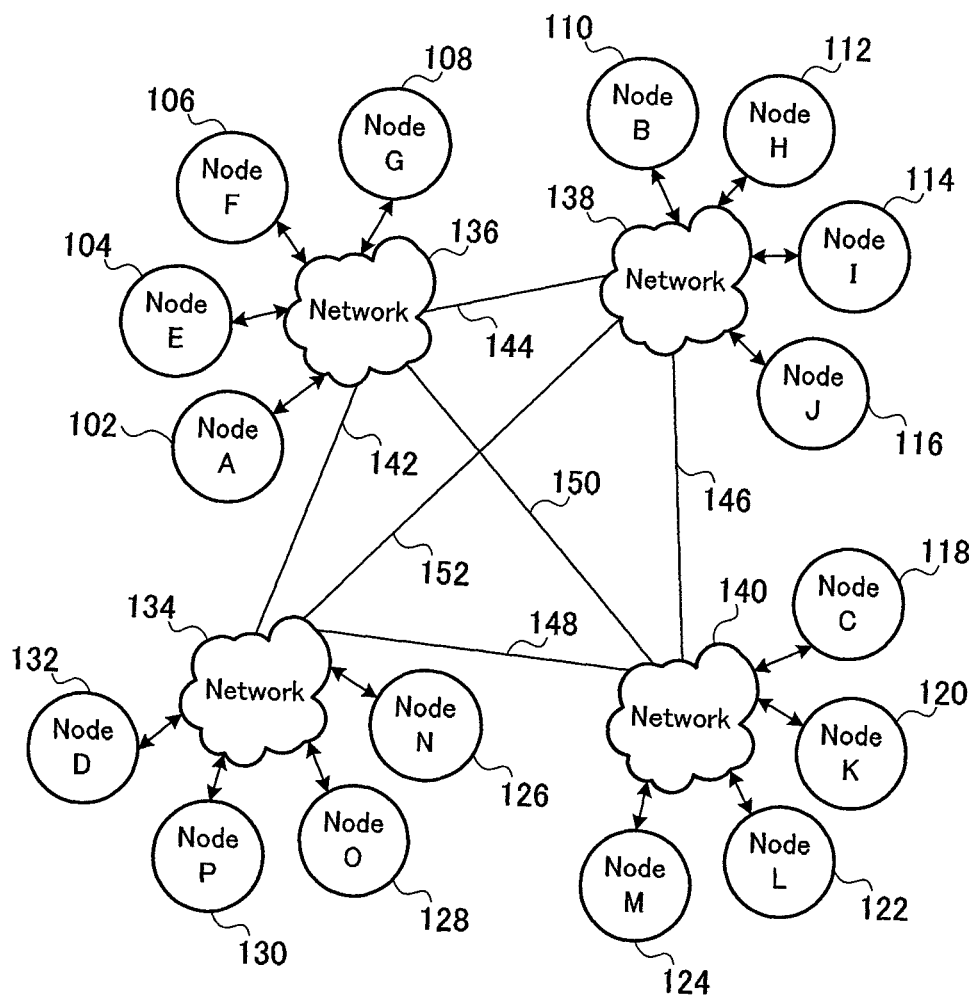
FIG. 1A shows a network with multiple ALM and ALM-MCU nodes in an ALM session according to an embodiment of the present invention.

The new technique enables decentralized selective and dynamic Application Layer Multicast (ALM) based data (or content) mixing by Multipoint Control Unit (MCU) node. Dynamic ALM based routing table information is used to selectively mix application layer content packets in order to remove content packet looping which causes content echo. In particular, this embodiment provides an apparatus and the associated method for performing decentralized selective and dynamic ALM based content mixing among ALM-MCU nodes. This technique is suitable for real-time audio/video conferencing in order to minimize end-to-end packet delivery delay due to delayed route convergence and reduce content (e.g., audio) echo, for example. Here, although echo is essentially caused in audio data, an overlap of images might be caused in image data. Therefore, in this embodiment, echo related to audio data will be referred to as "audio echo," and echo related to content widely including audio data and image data will be referred to as "content echo" or "echo".

ALM requires all the participating nodes (e.g., MCU node) in a given active session to be collectively responsible in routing the group's streaming data among the members via best path. This achieves the objectives of a self-supported AV streaming path construction, maintenance and usage in a decentralized manner. In Japanese patent application No. 2008-306671 filed on Dec. 1, 2008, N-Tree algorithm has been proposed to solve the problem of bandwidth fairness and fast route convergence with fair bandwidth tree construction.

However, this self regulated routing mechanism (N-Tree algorithm) requires periodic control path information exchange among dynamic members by a route information collection and dissemination node or nodes. Routing information is dynamically constructed by a dedicated ALM node or with collaboration by a group of ALM nodes. This dynamism leads to frequent path/direction changes in an ALM session which cause content packet looping or duplication that leads to content echo at ALM-MCU nodes.

ALM packet routing based on routing table information does not consider content packet mixing operations by MCU nodes. MCU node mixes all content packets that it receives without knowing the content or the source of the content. Thus, this leads to content echo problem since the duplicated content from the same source is received either in partially mixed form or in original form.

Direct mixing of content by an ALM-MCU node without ALM path awareness causes incorrect mixing for MCU-to-MCU channels streaming in ALM networks. Therefore, it is an object of this embodiment to provide an apparatus and method for performing decentralized selective and dynamic ALM based data (or content) mixing to remove echo or reduce content delay/jitter with dynamic ALM path adaptation. Besides, this also enables mixing load distribution along the ALM-MCU node path.

This is achieved by dynamically analyzing ALM routing table information and constructing packet mixing state information along the ALM routes. The packet mixing state information in turn is used to perform mandatory or selective content mixing at the ALM-MCU node to reduce content echo and ensure that minimal packet delay is maintained. Generally, this embodiment uses ALM technology for MCU nodes to dynamically route original content packets or partially mixed content packets along the ALM path to achieve minimal end-to-end delay and mixing load distribution.

This embodiment is supplemented with drawings to illustrate this embodiment with reference to specific figure elements.

Definitions of specific terms used throughout the embodiment of the present invention are listed below.

"ALM Session": An ALM session is defined as a logical session where two or more ALM nodes (including ALM or ALM-MCU nodes) as shown in FIG. 1A, for example, are connected via a network in a multiparty application to exchange data packets among them simultaneously.

"Non-ALM node" (or "End Node"): A node that does not perform any ALM function. It is usually a content producing (source) or content consuming node. In other words, a node that participates in ALM Session and is not capable of performing ALM based packet routing.

"ALM node": A node that participates in an ALM session and is capable of performing ALM based packet routing.

"ALM-MCU node": An ALM node that performs content mixing for received content and forwards the content to another ALM or ALM-MCU node.

"Direct Mixing": MCU operation that mixes all content that it receives without any specific knowledge of its originating source or content.

"Partial Mixing": Only some of the ALM session participants' content is mixed by an ALM-MCU node.

Figure 11:
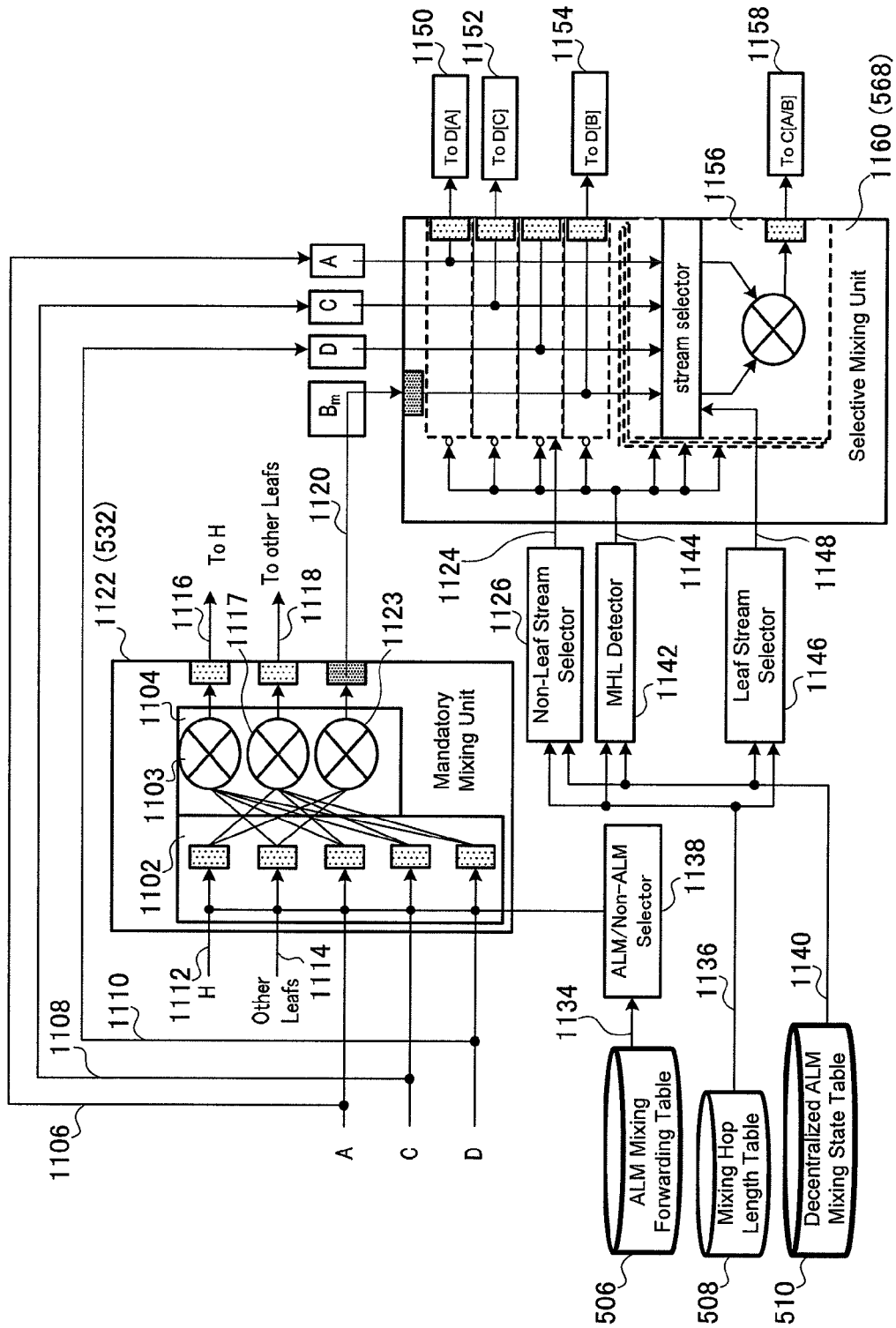
FIG. 11 depicts an example of ALM-MCU apparatus embodying the apparatus of the ALM based decentralized selective and dynamic mixing MCU of FIG. 5.

"Mandatory Mixing": Specified content is mixed by an ALM-MCU node based on an ALM Mixing Forwarding (AMF) table as shown in FIG. 11.

"Selective Mixing": Selective content is mixed by an ALM-MCU node based on a Mixing Hop Length (MHL) table and a Decentralized ALM Mixing State (DAMS) table as shown in FIG. 11.

"MCU-to-MCU channel": Network path between ALM-MCU nodes to stream original or partially mixed content.

"Leaf node": A node that is directly connected to ALM-MCU node and does not perform packet routing, such as nodes H and K in FIG. 3.

"Non-Leaf node": A node either ALM or Non-ALM node that is indirectly connected to ALM-MCU node where its content packets are routed by any other ALM nodes, such as nodes A, B, C and D in FIG. 3, for example.

"Hop length": the number of transfers from the source node to the destination node, which is also referred to as "hop count" or "hop(ping) number." According to the present invention, hopping number between the source node and the next destination node is used to control mixing processing of data.

This embodiment enables decentralized selective and dynamic ALM based content mixing by MCU node. Dynamic ALM based routing table information is used to selectively mix application layer content packets in order to remove content packet looping which causes content echo. In particular, this embodiment provides an apparatus and method for performing decentralized selective and dynamic ALM based content mixing among ALM-MCU nodes. This technique is suitable for real-time audio/video conferencing in order to minimize end-to-end packet delivery delay due to delayed route convergence and minimize content (e.g., audio) echo, for example.

ALM requires all participating nodes, including ALM and ALM-MCU nodes in a given active session, to be collectively responsible in routing the group's streaming data among the members via a best path. An ALM node is responsible for using the ALM routing information to route content packets in a conferencing session. An ALM-MCU node, on the other hand, mixes the content besides forwarding it to another ALM or ALM-MCU or end node.

ALM routing information including ALM forwarding table is dynamically constructed by a dedicated ALM node or with collaboration by a group of ALM nodes as specified in the above-mentioned Japanese patent application No. 2008-306671 filed on Dec. 1, 2008, based on network and other resources fluctuation. This dynamism leads to frequent path/ direction changes in an ALM session.

The newly-constructed ALM forwarding table is distributed to all ALM nodes in the ALM session. In this embodiment, utilizing this ALM forwarding table, new tables including an ALM Mixing Forwarding (AMF) table, a Mixing Hop Length (MHL) table, and a Decentralized ALM Mixing State (DAMS) table are constructed based on specific methods as described in the embodiments. An ALM based decentralized selective and dynamic mixing MCU apparatus and associated methods are disclosed in the embodiments.

The illustrated apparatus removes content packet looping or duplication that leads to content echo at ALM-MCU nodes, and achieves content echo reduction and minimal conferencing session delay and enables mixing load distribution along ALM path.

Currently, ALM packet routing is performed based on an ALM routing table information. However, the ALM forwarding table does not consider content packet mixing operations by ALM-MCU nodes at all. So each ALM-MCU node mixes all content packets that it receives without knowing what the content is or what the source of the content is. Thus, this leads to a content echo problem since the duplicated content from the same source is received either in pre-mixed form or in original form.

Therefore, this embodiment provides an apparatus and method for performing decentralized selective and dynamic ALM based data (or content) mixing to remove echo or reduce content delay/jitter with dynamic ALM path adaptation. Besides, this also enables mixing load distribution along the ALM-MCU node path.

In this embodiment, as mentioned above, this is achieved by dynamically analyzing ALM routing table information and constructing packet mixing state information. The packet mixing state information in turn is used to perform mandatory or selective content mixing at the ALM-MCU node to reduce content echo and ensure that minimal packet delay is maintained. Generally, this embodiment uses ALM technology for MCU nodes to dynamically route original content packets or partially mixed content packets along the ALM path to achieve minimal end-to-end delay and mixing load distribution.

The following description explains this embodiment in detail with the assistance of diagrams and flowcharts. Also, a case will be assumed and explained with this embodiment where, for example, this embodiment is applied to a multi-point video conferencing system. In a multipoint video conferencing system, MCU is generally utilized.

Figure 1B:
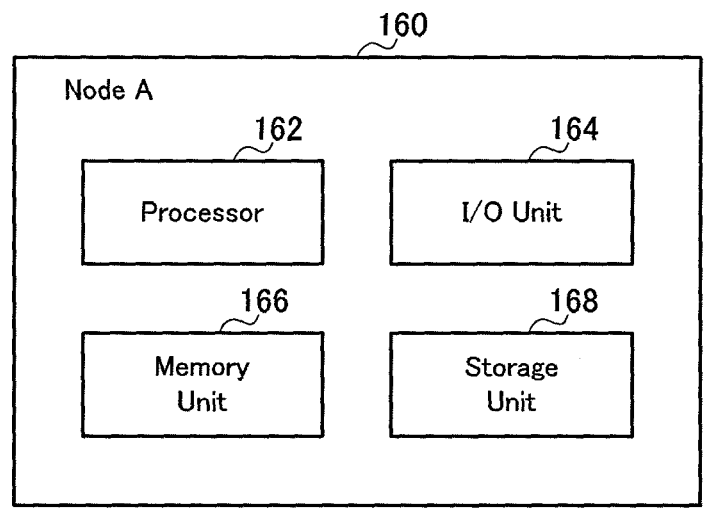
FIG. 1B shows a block diagram illustrating an example of a schematic hardware configuration of each node shown in FIG. 1A.
Figure 1C:
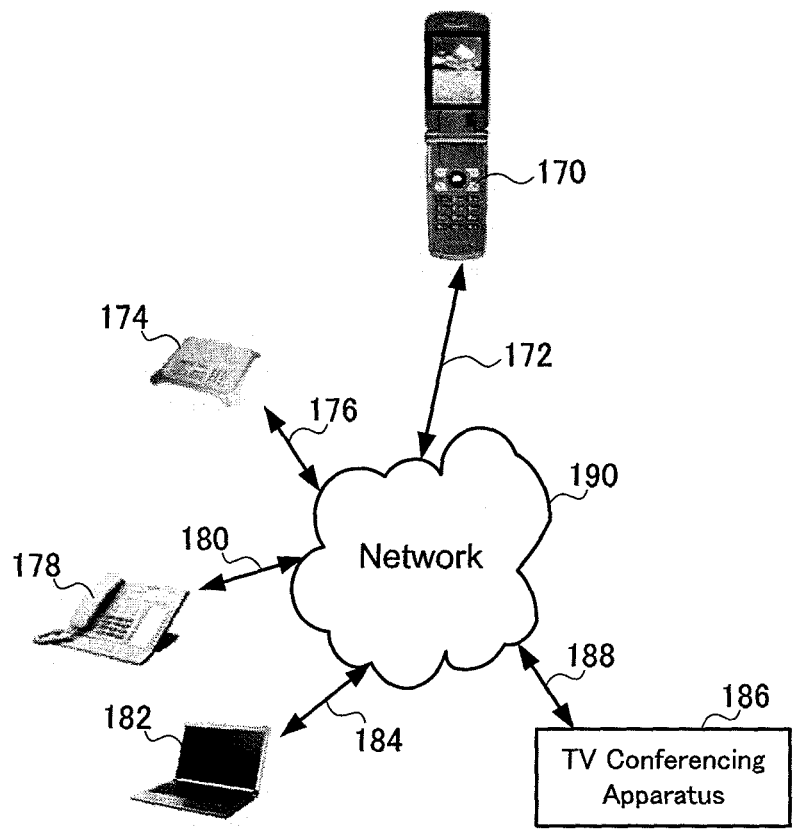
FIG. 1C shows some concrete examples of an equipment that comprises each node in FIG. 1A.

FIG. 1A shows multiple ALM nodes 102, 104, 106, 108, 110, 112, 114, 116, 118, 120, 122, 124, 126, 128, 130, 132 connected to local networks 134, 136, 138, 140. The local networks 134, 136, 138, 140 in turn may be interconnected via different network links 142, 144, 146, 148, 152, 150. Eventually, all nodes in the ALM session are connected in one network enabling connectivity among them. Multimedia applications, such as a video conferencing application that resides in each client, for example, are able to exchange an AV stream simultaneously among them in an ALM session. Each ALM node 160 (for example, node A in FIG. 1A) is provided with a computer system and has a hardware configuration including, for example, processor 162, input/output (I/O) unit 164, and computer readable medium such as memory unit 166 and storage unit 168, as shown in FIG. 1B. Each node shown in FIG. 1A may be such an equipment as, for example, cell phone 170, telephone conferencing apparatus 174, IP telephone 178, personal computer (PC) 182 or TV conferencing apparatus 186, as shown in FIG. 1C. These equipments 170, 174, 178, 182, 186 are connected via respective links 172, 176, 180, 184, 188 to local network 190 as shown in FIG. 1C, for example.

In order to realize a decentralized dynamic selective content mixing operation, at least two or more ALM-MCU nodes must exist in the network. FIG. 1A illustrates this with four ALM-MCU nodes 102, 110, 118, 132 with one node in each local network 136, 138, 140, 134, respectively. However, ALM-MCU nodes can be located in any part of the network, and not necessarily in the same local network. This is decided by an N-Tree algorithm and ALM nodes mixing (MCU) capability. A group membership function as described in the above-mentioned Japanese patent application No. 2008-306671 filed on Dec. 1, 2008 facilitates the formation of the ALM session. ALM nodes stream its content to only one ALM-MCU node in the network based on ALM session configuration.

An example of the method for forming a local network and ALM nodes in an ALM session is described in the above-mentioned Japanese patent application No. 2008-306671 filed on Dec. 1, 2008. One of the ALM nodes can perform route information gathering by communicating with all other ALM nodes and exchange network information between them simultaneously. This node is responsible for collecting information used to form overlay network and disseminate the information to all other nodes in the form of ALM forwarding table. This overlay information is used by all ALM nodes to form overlay network among them to multicast data packets at application layer.

In particular, this embodiment relates to ALM-MCU node performed by all ALM-MCU nodes in an ALM session. The following paragraphs describe the problem faced by ALM-MCU nodes with reference to FIG. 2 and FIG. 3.

Figure 2:
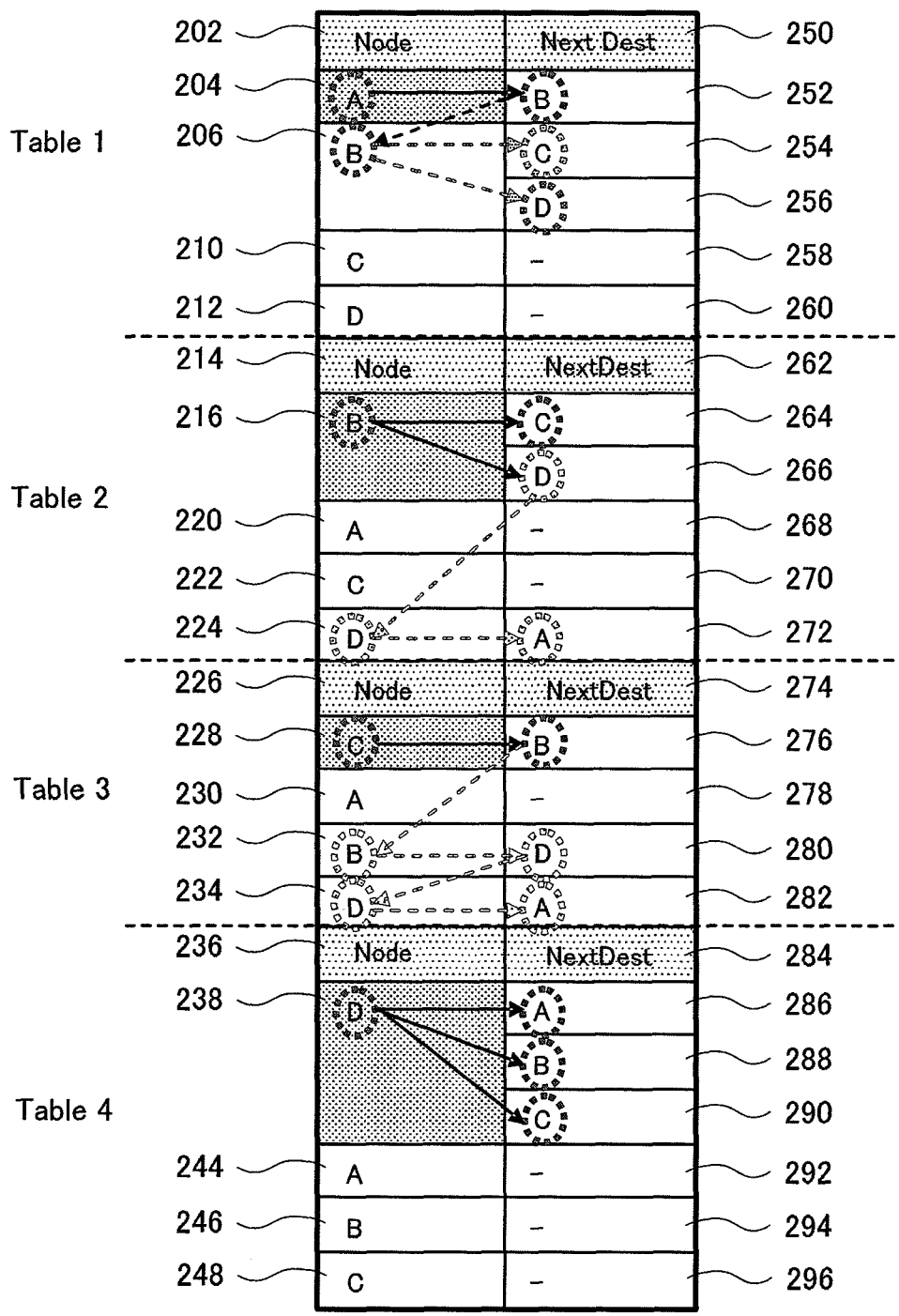
FIG. 2 illustrates an example of an instance of an ALM forwarding (routing) table according to the embodiment of the present invention.
Figure 3:
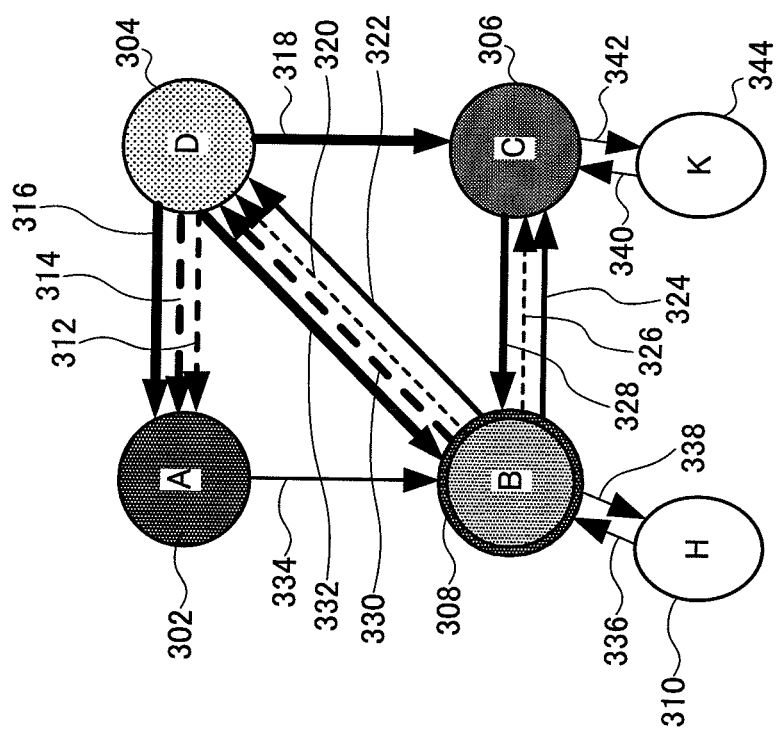
FIG. 3 illustrates an example of ALM-MCU multimedia streaming scenario with respect to the ALM forwarding table shown in FIG. 2.
Figure 6:
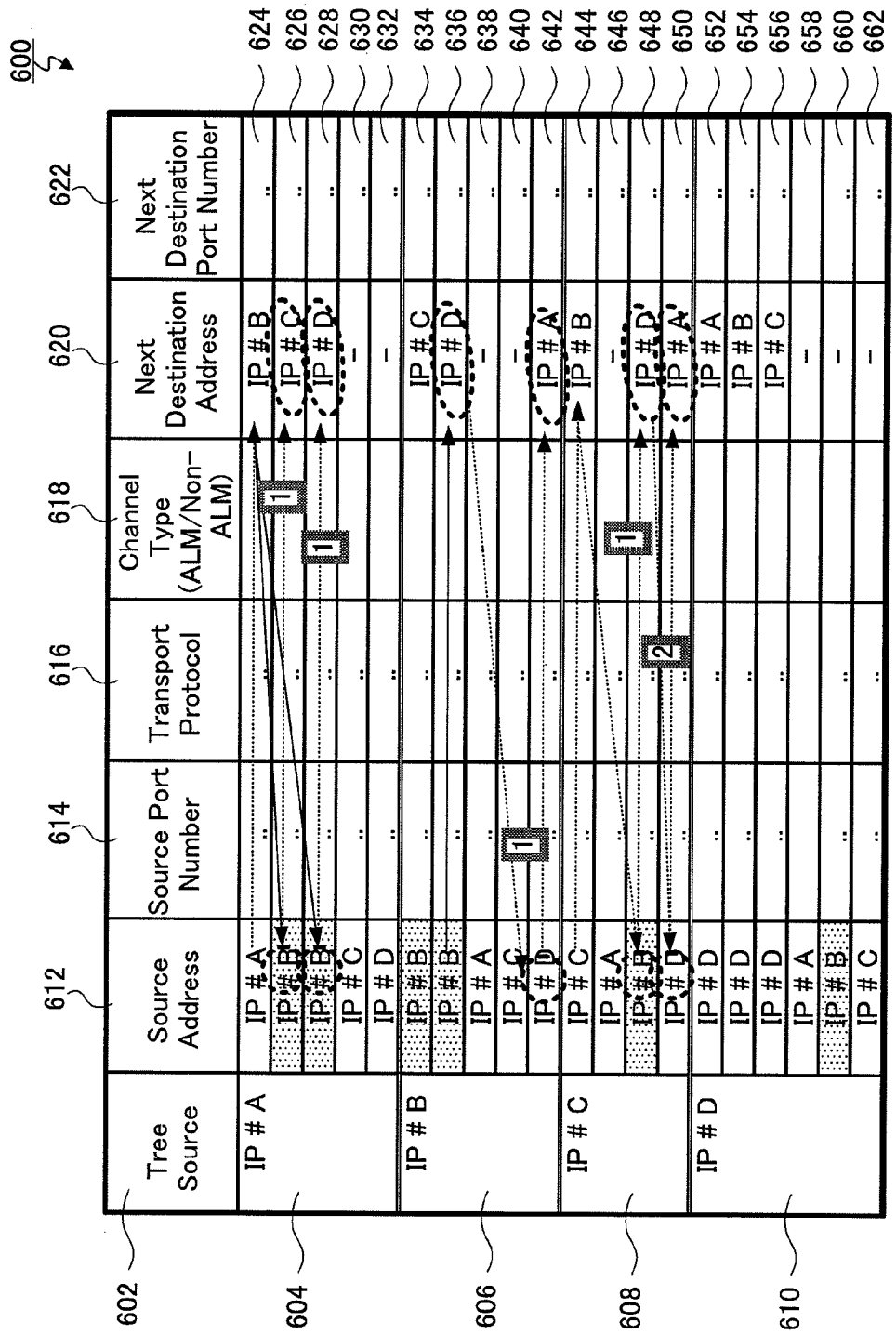
FIG. 6 illustrates an ALM Mixing Forwarding (AMF) table according to the embodiment of the present invention.
Figure 9:
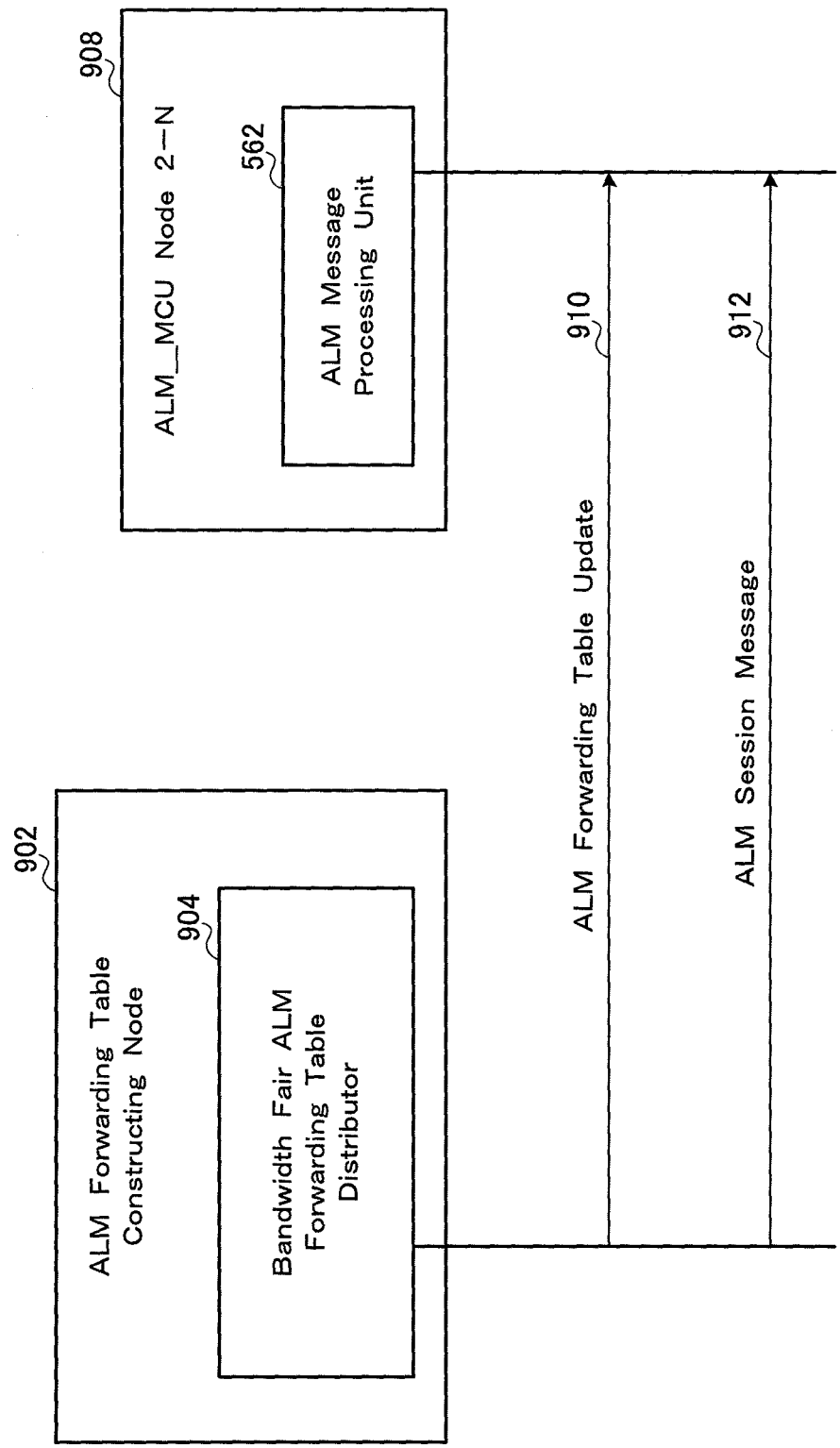
FIG. 9 illustrates a message exchange sequence between ALM nodes according to the embodiment of the present invention.
Figure 10:
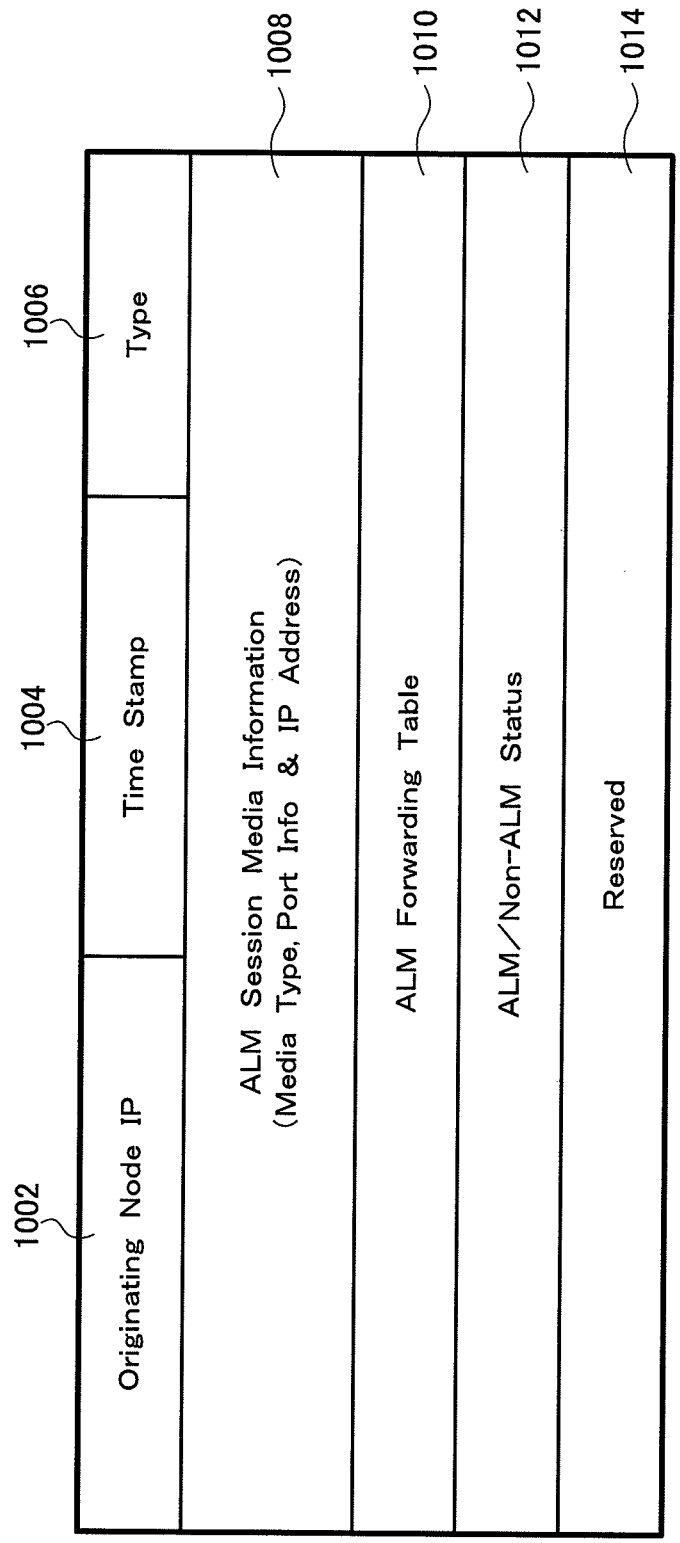
FIG. 10 illustrates an ALM-MCU message format according to the embodiment of the present invention.

FIG. 2 illustrates a simplified example of ALM forwarding table according to the embodiment, which may be used to explain the problem. Detailed ALM forwarding table is illustrated in FIG. 6 which will be explained later as an ALM Mixing Forwarding (AMF) table. Further, in FIG. 2, hop count (or hop number) is visualized by reviewing FIG. 3, for explanatory purposes only. As described above, the hop count or hop(ping) number is the number of transfers from the source node to the destination node. In other words, the hop number is a number of the node(s) between the source node and the destination node. If the destination node is the final destination node, it might be alternatively called "end node" in the specification. In other words, the hop count is one of routing metrics used to measure the distance between the source of data and the destination of the data, and is equivalent to the number of routers (and the number of network apparatuses having similar functions) through which the data passes along the path from the source to the destination. FIG. 3 illustrates an example of ALM-MCU multimedia streaming scenario with respect to the forwarding table shown in FIG. 2. FIGS. 4A to 4D illustrate content of four sub-forwarding tables which are concatenated in FIG. 2 and in which four nodes A to D shown in FIG. 3 are the transmission sources. The ALM forwarding table is exchanged by ALM nodes as illustrated in FIG. 9, utilizing a specified message format as shown in FIG. 10. FIG. 9 and FIG. 10 will be described in detail later.

In FIG. 2, "Node" column 202 represents source of a stream and "Next Destination" (abbreviated to "Next Dest" in figures, as the case may be) column 250 represents next destination of the stream to be forwarded, for example. There are four sub-forwarding tables that have been concatenated in FIG. 2, namely, Table 1 having "Node" column 202 and "Next Destination" column 250 with their fields 204-212 and 252-260, Table 2 having "Node" column 214 and "Next Destination" column 264 with their fields 216-224 and 264-272, Table 3 having "Node" column 226 and "Next Destination" column 274 with their fields 228-234 and 276-282 and Table 4 having "Node" column 236 and "Next Destination" column 284 with their fields 238-248 and 286-296. These tables represent four nodes, namely Node A (designated by 302), Node B (designated by 308), Node C (designated by 306) and Node D (designated by 304), respectively, as shown in FIG. 3 and FIGS. 4A to 4D. These four nodes maintain their own distribution tree originating from the respective nodes. FIGS. 4A, 4B, 4C and 4D correspond to Tables 1, 2, 3 and 4, respectively. Each node's sub-forwarding table (Table 1 to Table 4) contains forwarding table information that describes next hop(s) where the AV packets should be forwarded to. All four nodes (Node A to Node D) receive all the identical ALM forwarding tables. Using these ALM forwarding tables, each node builds its own AMF, MHL and DAMS tables (see FIGS. 6, 7 and 8, respectively) as described in detail later.

Figure 4C:
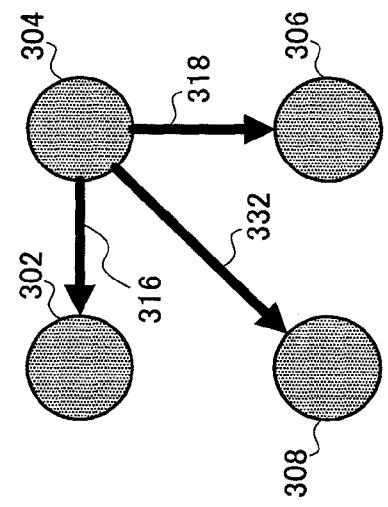
Figure 4A:
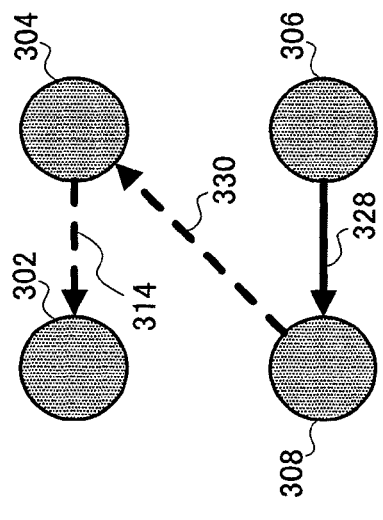

Specifically, Table 1 represents ALM sub-forwarding table of Node A as shown in FIG. 4A. This table can be interpreted as follows. AV packets originating from source Node A (see field 204) are forwarded to the next destination of Node B (see field 252). Next, Node B (see field 206) forwards the received packets to the next destinations of Node C (see field 254) and Node D (see field 256), respectively, by duplicating the content. Node C (see field 210) and Node D (see field 212) are end nodes, thus they do not forward (see fields 258 and 260) the received packets with source of Node A (see field 204). Accordingly, Table 1 shows that Node C and Node D are one (1) hop (Node B) away from source Node A, respectively.

Figure 4B:
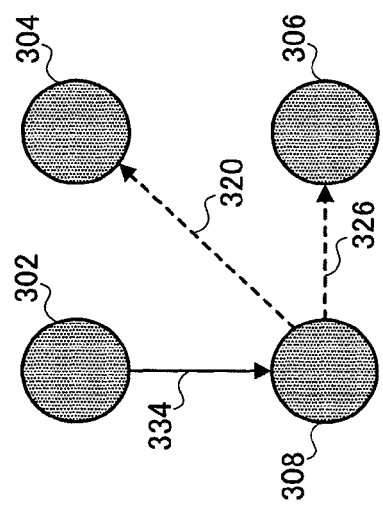

Table 2 represents ALM sub-forwarding table of Node B as shown in FIG. 4B. Packets originating from source Node B (see field 216) are forwarded to the next destination nodes of Node C (see field 264) and Node D (see field 266). While Node A (see field 220) and Node C (see field 222) do not forward (268, 270) received packets since they are end nodes, Node D (see field 224) forwards the received packets originated from source Node B, to Node A (see field 272). Accordingly, Table 2 shows that Node A is one (1) hop (Node D) away from source Node B.

Table 3 represents ALM sub-forwarding table of Node C as shown in FIG. 4C. Packets originating from source Node C (see field 228) are forwarded to Node B (see field 276). Node A (see field 230) consumes all packets from source Node C, while Node B (see field 232) and Node D (see field 234) forward the received packets originated from source Node C (see field 228), to Node D (see field 280) and Node A (see field 282), respectively. Accordingly, Table 3 shows that Node A is two (2) hops (Node B and Node D) away from source Node C and Node D is one (1) hop (Node B) away from source Node C.

Table 4 represents ALM sub-forwarding table of Node D as shown in FIG. 4D. Packets originating from source Node D (see field 238) are forwarded to Node A (see field 286), Node B (see field 288) and Node C (see field 290), respectively. Meanwhile, Node A (see field 244), Node B (see field 246) and Node C (see field 248) consume all packets received from source Node D (see field 238) and do not forward further (see fields 292, 294 and 296). Accordingly, Table 4 shows that since Node A, Node B and Node C are directly connected to Node D, they are zero (0) hop away from source Node D.

An ALM-MCU node mixes content that it receives before forwarding it to a specific next destination. The problem of this assumption in ALM case is illustrated by an example in FIG. 3 and FIGS. 4A to 4D. Each ALM-MCU node 302, 304, 306 and 308 is responsible for mixing its own content with all leaf nodes' contents, before forwarding it to other ALM-MCU nodes based on ALM forwarding table. FIG. 3 and FIGS. 4A to 4D provide an illustrated sequence of packet forwarding operation based on ALM forwarding table as in FIG. 2, by focusing on ALM-MCU nodes 102, 110, 118 and 132 with reference to FIG. 1A. As a non-limiting example, mixing operation of Node B (designated by 308 in FIG. 3) will be focused throughout the embodiment.

Referring to Table 1 of Node A, AV stream flows from Node A to Node B via path 334 (see FIG. 3 and FIG. 4A). Node B in turn mixes: (1) content from leaf Node H (designated by 310) via link 336, (2) content received from Node A via link 334, (3) its own content, if any, (4) content received from Node C via link 328, and (5) content received from Node D via link 332, not in this case but if possible (that is, this explanation is applicable to all types of ALM tables, but in order to reflect the example of FIG. 13B, it will state that only contents properly selected from the cases (1) to (5) are mixed). The mixed content is in turn forwarded to Node C via link 324 and Node D via link 322, respectively (see FIG. 3 and FIG. 4B). Node D forward the received content from Node B via link 322, to Node A via link 312 (see FIG. 3 and FIG. 4B). Also Node B is responsible for forwarding the mixed content to Node H (which is Non-ALM node) via link 338 (see FIG. 3), but without Node H's own content to prevent echo.

Similarly, Node C receives content from Node D via link 318 and content from leaf Node K (designated by 344) via link 340 (see FIG. 3 and FIG. 4D), and mixes them with its own content, if any, before forwarding the mixed content to Node B via link 328 (see FIG. 3 and FIG. 4C). Node C is also responsible for mixing all the received content via links 326, 324 and 318, except Node K's content, and forwarding it to Node K via link 342 (see FIG. 3). On the other hand, Node D mixes its own content, if any, and content forwarded by Node B via links 320, 322 and 330 (see FIG. 3 and FIGS. 4A to 4C), before forwarding it to Node A (see FIG. 3 and FIGS. 4B to 4C). Node A in turn mixes all the received content via links 312, 314 and 316 (see FIG. 3 and FIGS. 4B to 4D), before forwarding to its leaf nodes, if any.

The problem of current MCU solutions by adopting ALM path unaware mixing (where mixing nodes are not aware that ALM path routing is changing and content path switching is taking place) can be examined by focusing on Node B content with respect to Node C stream, for example. Node B mixed content via link 324 can be represented as the content of ((A+H)+C+D) (received via links 334+336+328+332). However, C's content is the mixed content of (K+D) (received via links 340+318). In this case, Node K via link 342 receives duplicate content of Node D, which causes echo. In order to remove the duplicated content mixing, ALM-MCU node needs to be aware of the content it is processing and the associated path being used.

This embodiment eliminates the mixing problem by intelligently detecting which content is to be mixed before being forwarded and which content is to be forwarded without being mixed along the original ALM path, thus maintaining a minimal delay and load distribution. The rest of the description in this specification will explain this embodiment in detail further with reference to FIG. 5 or later.

Figure 5:
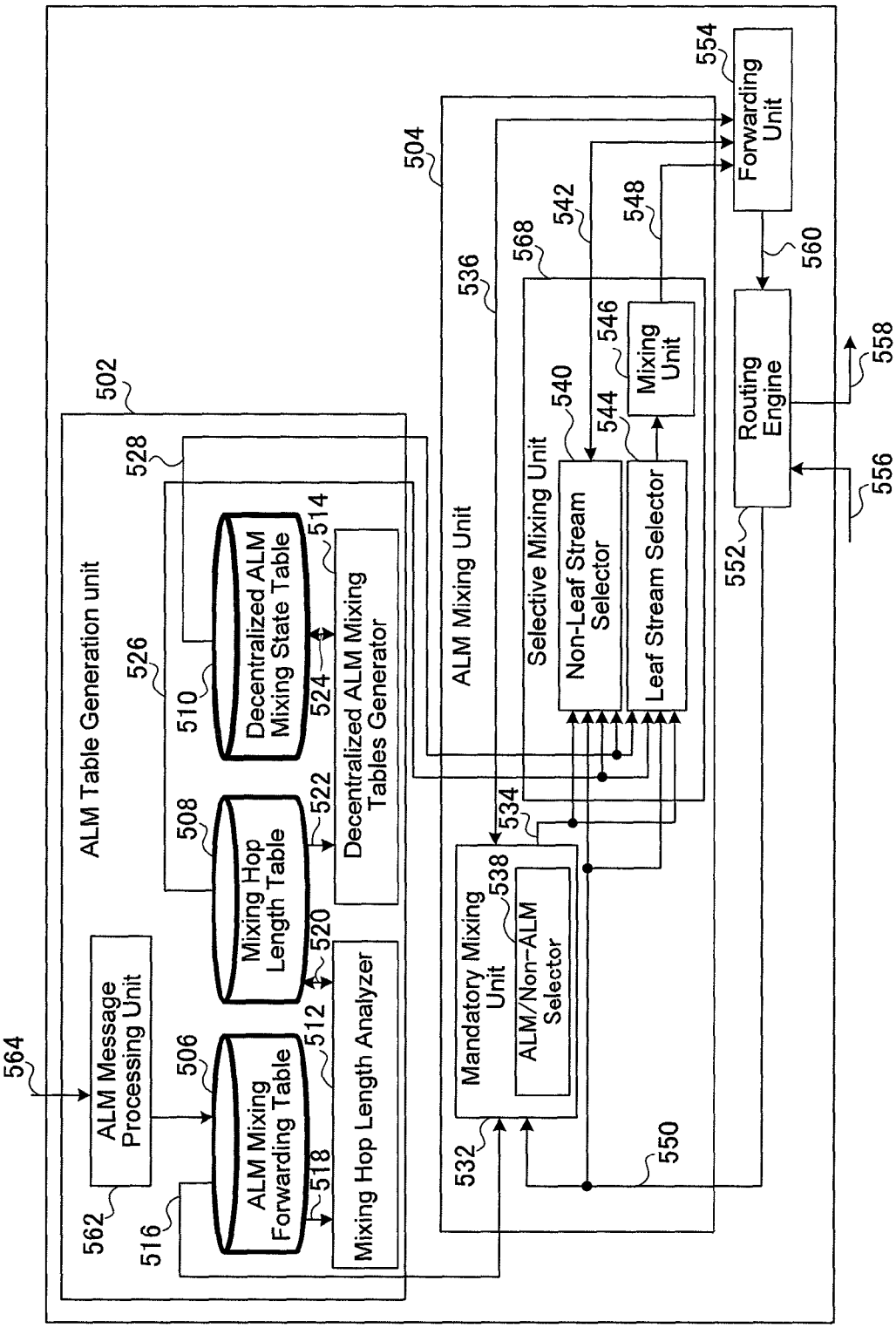
FIG. 5 shows an apparatus of an ALM based decentralized selective and dynamic mixing MCU according to the embodiment of the present invention.

FIG. 5 shows an apparatus of an ALM based decentralized selective and dynamic mixing MCU according to the present embodiment. FIG. 5 illustrates a key apparatus 500 of this embodiment which contains two main units: ALM table generation unit 502 and ALM mixing unit 504. ALM table generation unit 502 includes ALM message processing unit 562, ALM Mixing Forwarding (AMF) table database 506, Mixing Hop Length (MHL) table database 508, Decentralized ALM Mixing State (DAMS) table database 510, Mixing Hop Length (MHL) analyzer 512 and Decentralized ALM Mixing State (DAMS) table generator 514. ALM mixing unit 504 includes mandatory mixing unit 532 and selective mixing unit 568. Mandatory mixing unit 532 further includes ALM/non-ALM selector 538. Selective mixing unit 568 further includes non-leaf stream selector 540, leaf stream selector 544 and mixing unit 546. This apparatus 500 further contains routing engine 552 and forwarding unit 554. FIG. 6 illustrates an example of the AMF table, FIG. 7 illustrates an example of the MHL table, and FIG. 8 illustrates an example of the DAMS table.

ALM table generation unit 502 is responsible for processing ALM forwarding table related information which is used by mandatory mixing unit 532 and selective mixing unit 568 of ALM mixing unit 504. This is achieved, for example, by performing a systematic analysis of the mixing hop length and building DMST table (at 1804 of FIG. 18) which is used to determine AV mixing operations (at 1806 of FIG. 18). The systematic analysis of the mixing hop length is performed by MHL analyzer 512 to build MHL table 700 of FIG. 7. The building of DMST table 800 of FIG. 8 is performed by DAMS table generator 514.

FIG. 9 illustrates a message exchange sequence between ALM nodes and FIG. 10 illustrates an ALM-MCU message format. ALM message processing unit 562 of ALM-MCU node 908 receives ALM Forwarding Table Update 910 and ALM Session Message 912 from ALM forwarding table constructing node 902 via interface 564, as shown in FIG. 9. The tables or messages are sent by bandwidth fair ALM forwarding table distributor 904, which is described in the above-mentioned Japanese patent application No. 2008-306671 filed on Dec. 1, 2008, to ALM message processing unit 562 of ALM-MCU node 908. FIG. 10 illustrates ALM-MCU message format with Originating Node IP Address field 1002, Time Stamp field 1004, Type field 1006, ALM Session Media Information field 1008 (which includes Media Type, Send/Receive Port Info & IP Address), ALM Forwarding Table field 1010, ALM/Non-ALM Status field 1012 and Reserved field 1014. Type field 1006 defines what type of information is carried by the message such ALM Forwarding Table Update 910 or ALM Session Message 912.

Here, the above apparatus may be software, hardware or combination of these. FIG. 11 depicts an example of the configuration. To be more specific, FIG. 11 depicts an example of ALM-MCU apparatus embodying the apparatus of the ALM based decentralized selective and dynamic mixing MCU of FIG. 5. Explanation will be shown below, also using FIG. 11 where necessary.

Further, the apparatus shown in FIG. 5 can be realized by, for example, CPU (Central Processing Unit), storage medium such as ROM (Read Only Memory) that stores control program, working memory such as RAM (Random Access Memory) and communication circuit (not shown). Referring to FIG. 1B, CPU corresponds to processor 162, ROM and RAM correspond to memory unit 166 as a computer readable medium, and the communication circuit corresponds to I/O unit 164. In this case, the function of each section described above is realized by executing control program (multicast communication program) stored in ROM (computer readable medium) in CPU.

Figure 18:
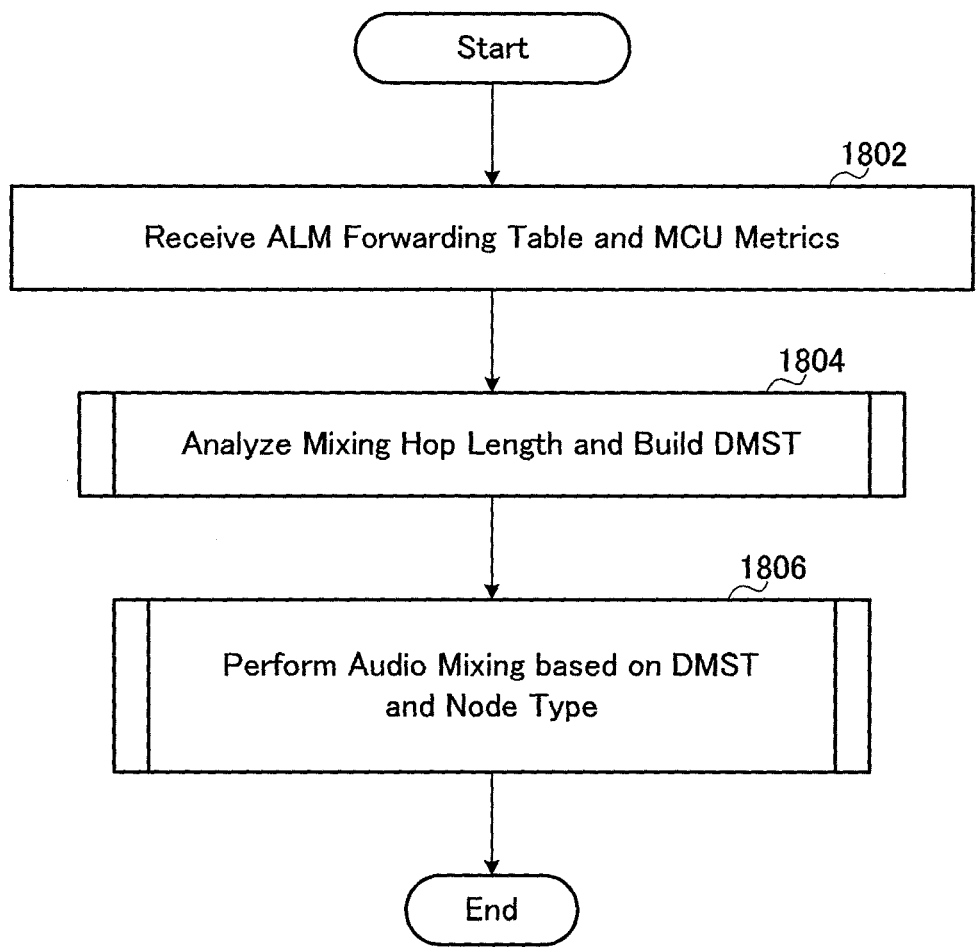
FIG. 18 shows main steps of the ALM based decentralized selective and dynamic mixing MCU operation according to the embodiment of the present invention.
Figure 21:
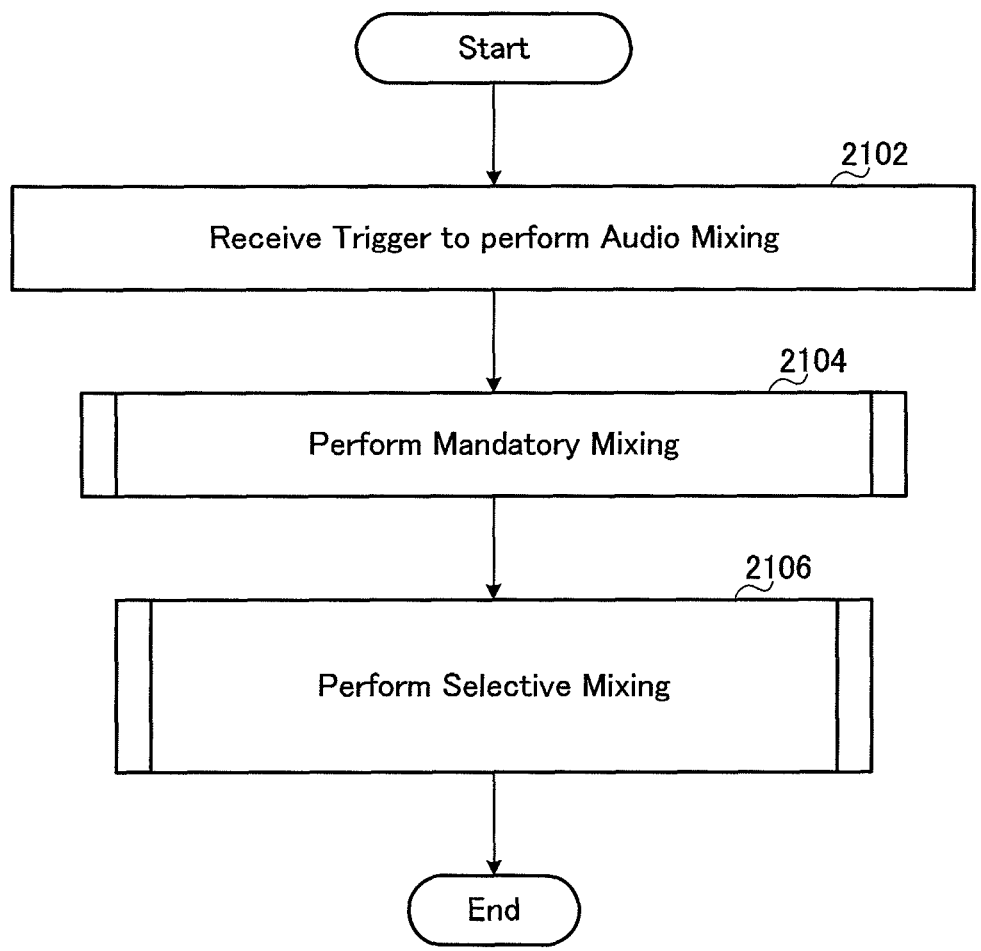
FIG. 21 shows mixing operation steps of an ALM-MCU node according to the embodiment of the present invention.
Figure 22:
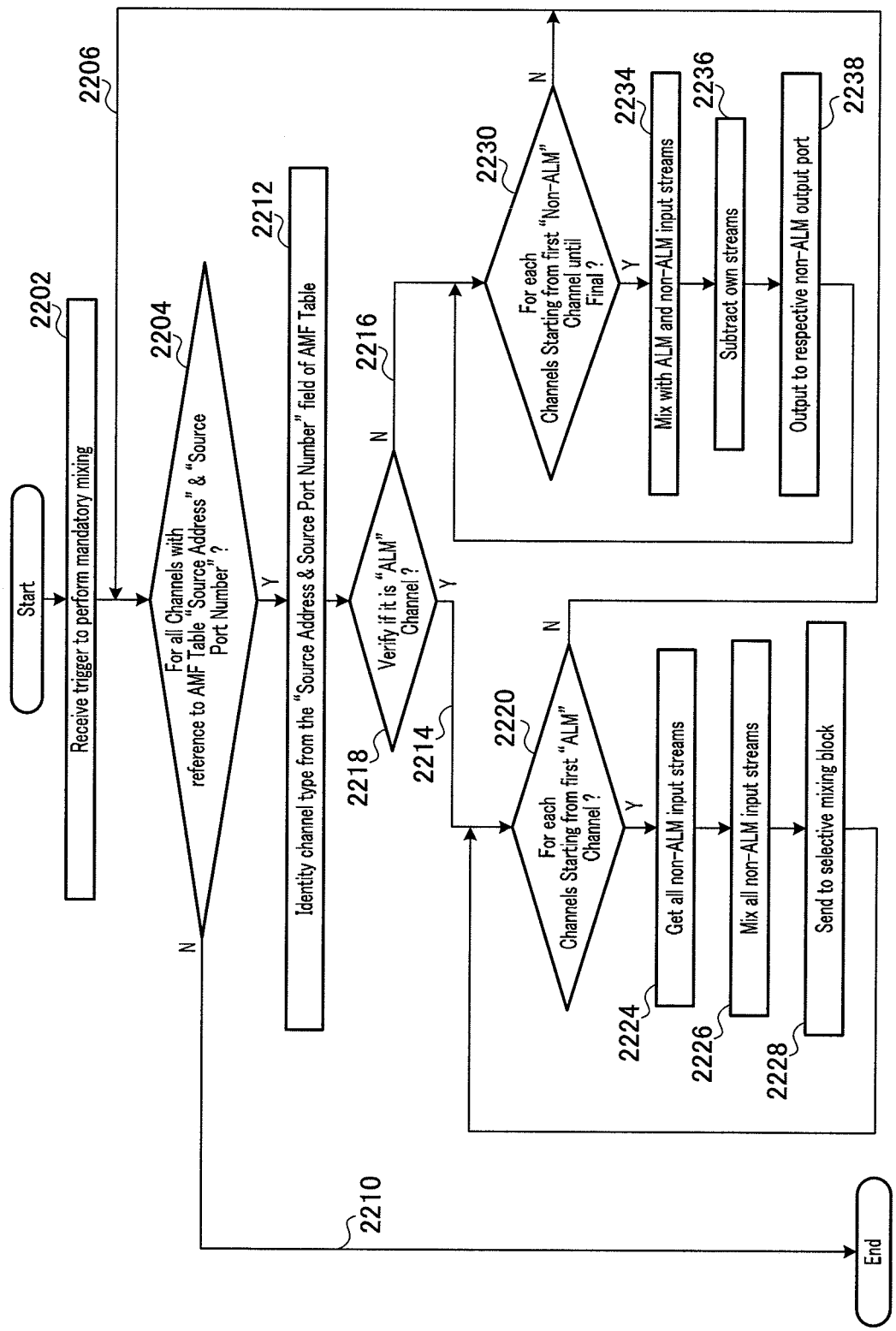
FIG. 22 shows mandatory mixing operation steps according to the embodiment of the present invention.
Figure 23:
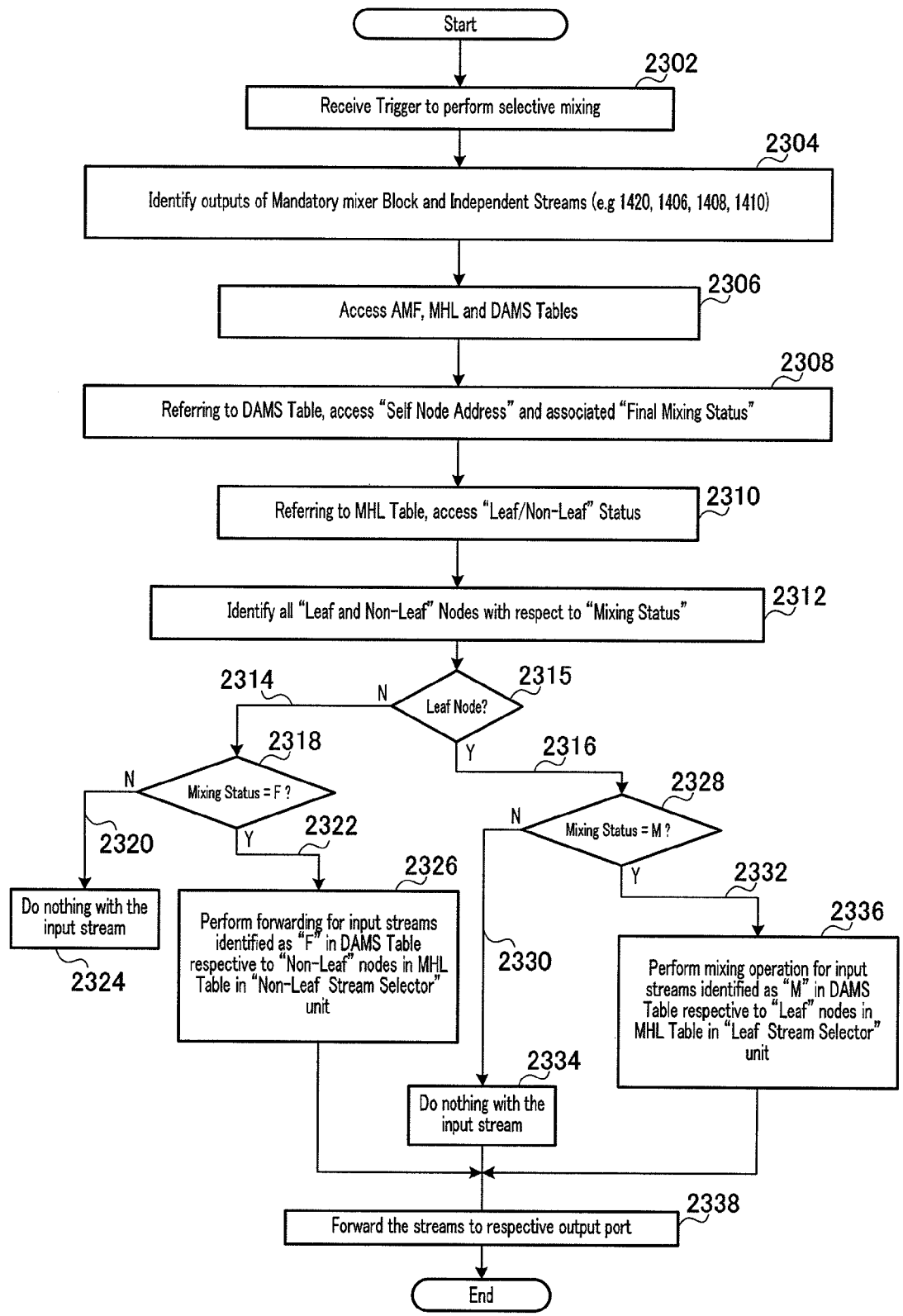
FIG. 23 shows selective mixing operation steps according to the embodiment of the present invention.

Next, the operations of the apparatus having the above configuration will be explained in detail using FIGS. 18 to 23. FIG. 18 shows main steps of the ALM based decentralized selective and dynamic mixing MCU operation, FIG. 19 shows steps of a MHL table construction method, FIG. 20 shows steps of a DAMS table creation, FIG. 21 shows mixing operation steps of an ALM-MCU node, FIG. 22 shows mandatory mixing operation steps, and FIG. 23 shows selective mixing operation steps.

Figure 19:
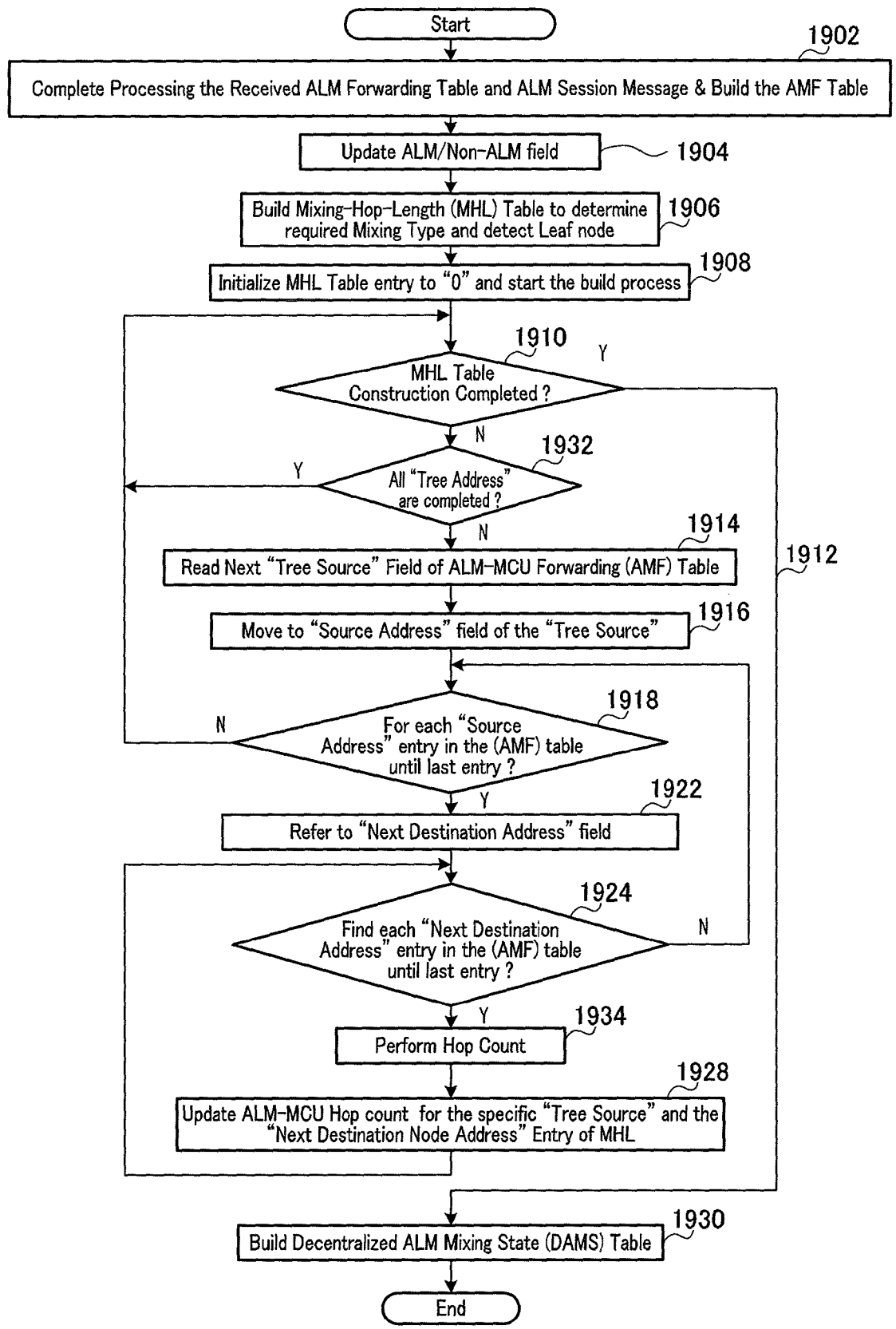
FIG. 19 shows steps of a MHL table construction method according to the embodiment of the present invention.
Figure 20:
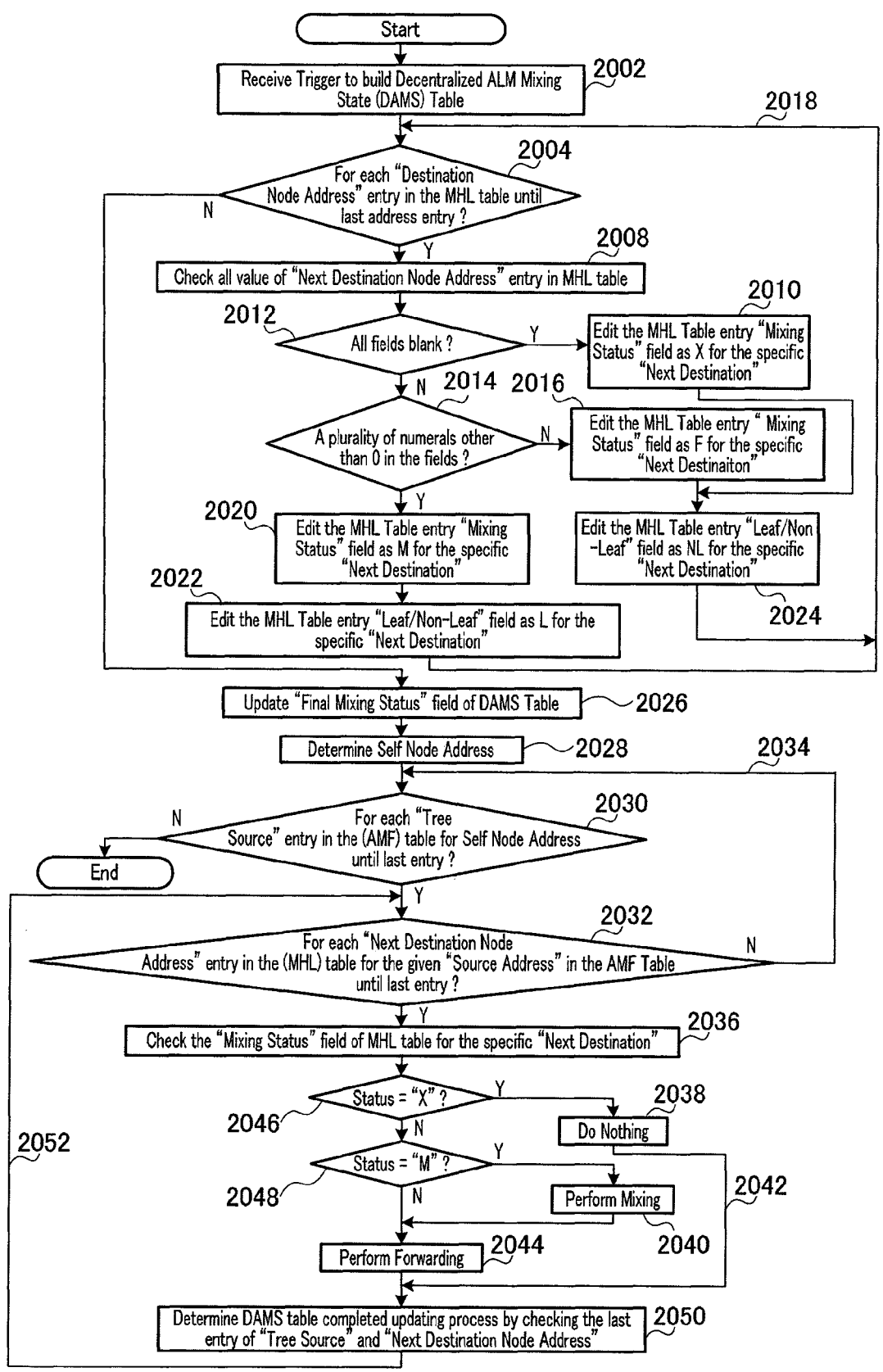
FIG. 20 shows steps of a DAMS table creation according to the embodiment of the present invention.

FIG. 19 and FIG. 20 illustrate key steps of ALM table generation unit 502.

Upon receiving ALM Forwarding Table Update 910 or ALM Session Message 912 (at 1902), AMF table 600 as shown in FIG. 6, will be constructed where ALM/Non-ALM field (column 618) will be updated (at 1904) based on ALM Session Message 912 via link 564 to AMF table database 506.

FIG. 6 is a detailed AMF table compared to FIG. 2 which contains complete information. The table entries in FIG. 6 are made generic while maintaining the same logic of FIG. 2 for ease of explanation. Column 602 represents AV content originating source node IP address regardless of the current ALM-MCU node in which the AMF table is located (e.g., Node A of FIG. 2 represents entry 604 as a tree source of Node A). Column 612 represents source address (e.g., 13.168.5.2) of the specific AV packets, column 614 represents source port number (e.g., 13.168.5.2: port #5555), column 616 represents transport protocol supported (e.g., TCP or UDP), column 618 represents channel type of ALM or Non-ALM, column 620 represents the next destination address (e.g., 13.168.4.3) and finally column 622 represents the next destination port number (e.g., 13.168.4.3: port #6666). Fields 604 (Node A), 606 (Node B), 608

(Node C) and 610 (Node D) illustrate root of the ALM tree, which is the same as in FIG. 2. Each table entry 624 through 662 reflects associated forwarding table for each node in ALM session based on ALM Forwarding Table Update 910 or ALM Session Message 912 information. This table changes dynamically based on ALM Forwarding Table Update 910 or ALM Session Message 912 information.

Next, explanation of how MHL and DAMS tables are build will be explained based on FIG. 5, FIG. 7 and FIG. 8.

We assume AMF table 600 (shown in FIG. 6) is already available (at 1902) and we shall focus on MHL table construction. AMF table 600 will be accessed by MHL analyzer 512 via link 518 to build MHL table 700 (shown in FIG. 7) in order to determine mixing type (mixing or forwarding) and leaf node detection (at 1906). The intention is to build a MHL table 700 as shown in FIG. 7. Before moving on to explain how MHL table 700 will be built by MHL analyzer 512, MHL table structure will be explained.

In FIG. 7, column 702 are entries of Tree Source information which is the same as entries of column 602 in FIG. 6, while columns 704-712 are entries of Next Destination Node Address information which is the same as entries of column 620 in FIG. 6. Row 726 keeps Mixing Status information while row 728 keeps Leaf or Non-Leaf Status information for each next destination node.

The MHL table 700 is constructed by MHL analyzer 512 and stores the constructed MHL table 700 via link 520 at the MHL table database 508.

Figure 12A:
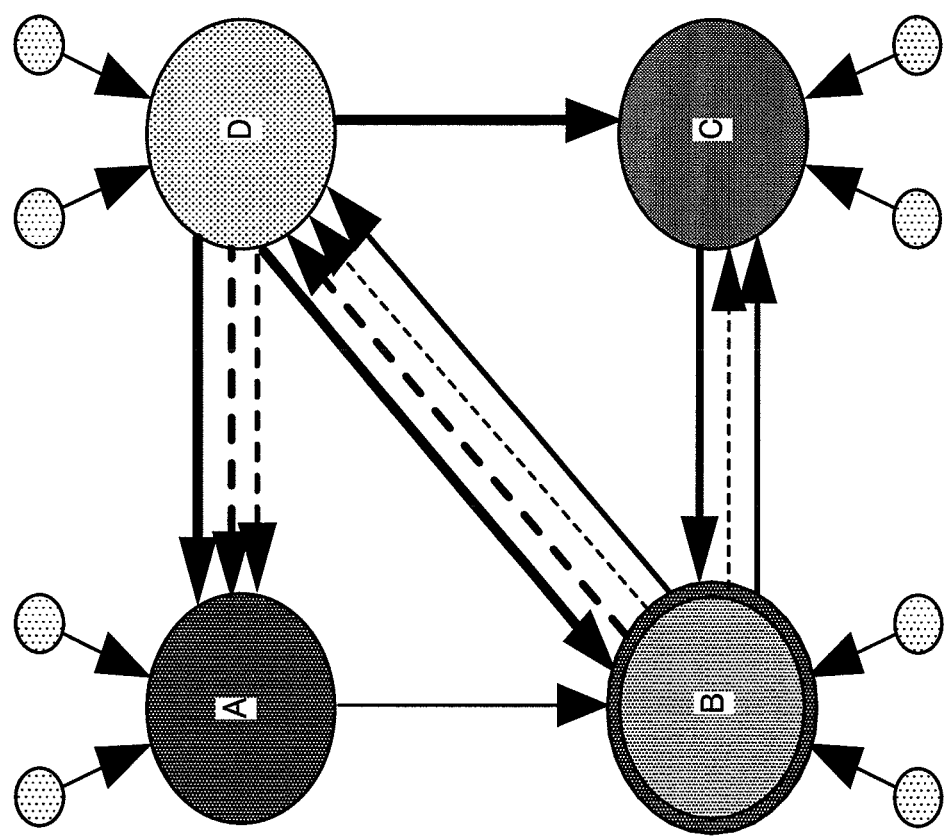

The MHL table, which is one feature of this embodiment, will be explained below in detail using FIGS. 12A-12B and 13A-13D. These figures show this embodiment having four nodes. Since the MHL table is made for each node (self node), there are four MHL tables as shown in FIGS. 13A-13D in this embodiment. FIG. 12A is associated with FIG. 3 illustrating forwarding routes between nodes, and FIG. 12B is associated with FIG. 2 illustrating the routing table of each node. FIGS. 13A to 13D show MHL tables (see FIG. 7) that are created by nodes A to D according to the following rules, in routings of FIGS. 12A to 12B. In FIGS. 13A to 13D, vertical A, B, C and D represent the source nodes, and horizontal A, B, C and D represent next destination nodes. "Mixing Status" shows one of three statuses when each node (self node) performs forwarding processing: status (F) where forwarding processing alone is performed; status (MF) where mixing processing is performed and then forwarding processing is performed; and status (X) where neither mixing nor forwarding processing is performed. The status (X) means to replay sound and/or video at the self node, that is to perform local consumption only. "Leaf/Non-Leaf" status shows if the next ALM-MCU node is directly or indirectly connected to this ALM-MCU node. In the fields where vertical A, B, C and D and horizontal A, B, C and D intersect, the number of times data is forwarded is shown as a hop length. These fields show the hop length "0" when data is not forwarded and is directly transmitted, and show values (natural number: 1, 2, 3 . . . ) representing the hop length equivalent to the number of transfers when data is forwarded. If data is neither directly transmitted nor transferred, the field is blank.

When each node (self node) receives data, this embodiment performs mixing and forwarding processing, performs forwarding processing alone, or performs processing of holding received data as is (without mixing or forwarding), according to a combination of hop lengths, which are associated with a plurality of source nodes (including the subject node), for the next destination node, in a hop length table. Here, mixing processing is performed only when there is no possibility that data overlaps. The holding received data as is without mixing or forwarding in this embodiment means to replay the sound and/or video at the self node.

To be more specific, "Mixing Status" for the next destination node at each node (self node) is determined according to the following rules:

(1) neither mixing processing nor forwarding processing is performed ("X") in the case where fields are all blank;

(2) mixing processing is not performed and forwarding processing alone is performed ("F") in the case where there are a plurality of numerals other than 0 in the fields; and (3) mixing processing is performed and then forwarding processing is performed ("MF") in cases other than the above cases.

Figures 13A, 13B:
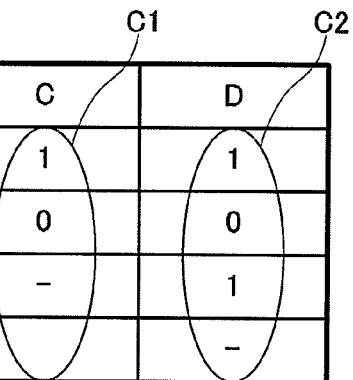

For example, in FIG. 13B, the combination C1 shows "1+0+blank". In this case, the mixing processing is performed ("MF") according to the above rule (3). Accordingly, the content from node A is mixed with the content of node B at node B (self node), and is forwarded to the next destination node C. Such mixed content (A+B) is not separable after such mixture.

By contrast, in FIG. 13B, the combination C2 shows "1+0+1". In this case, the mixing processing is not performed and only forwarding processing is performed ("F") according to the above rule (2). Accordingly, the content from node A and the content from node C are not mixed with the content of node B at node B (self node), and are forwarded to the next destination node D. Such forwarded content (A, B, C) is separable from each other at the next destination node D since the contents A, B and C are not mixed at the self node B. If the mixing processing were performed at node B (self node) against the above rule (2) in this case, mixed content (A+B+C) is forwarded to the next destination node D. At the node D, the contents B and C should be forwarded to the next destination node A as shown in C3 of FIG. 13D. The contents B and C, however, can not be separated from the mixed content (A+B+C). When the mixed content (A+B+C) is forwarded from the node D to the next destination node A, the content A is duplicated (=overlap) and this may cause echo (where own voice heard twice).

Similarly, in FIG. 13D, combination C3 shows "1+2+0". In this case, the mixing processing at the self node D is not performed and forwarding processing alone is performed ("F") according to the above rule (2). Accordingly, the content from node B and the content from node C are not mixed with the content D at node D (self node), and are forwarded to the next destination node A. Such forwarded content (B, C, D) is separable from each other at the next destination node A since the contents B, C and D are not mixed at the self node D.

Thus, if there is no possibility that data does not overlap, mixing processing is performed, while, if a plurality of transfer data are provided and there is a possibility that data overlap upon performing mixing processing, only forwarding processing is performed. By this means, it is possible to improve the channel use efficiency to a maximum extent while improving the degradation of communication quality due to the occurrence of echo on the receiving side.

Further, FIGS. 14A-14B and 15A-15E show the first example in the case of five nodes, and FIGS. 16A-16B and 17A-17E show the second example in the case of five nodes.

Figure 14A:
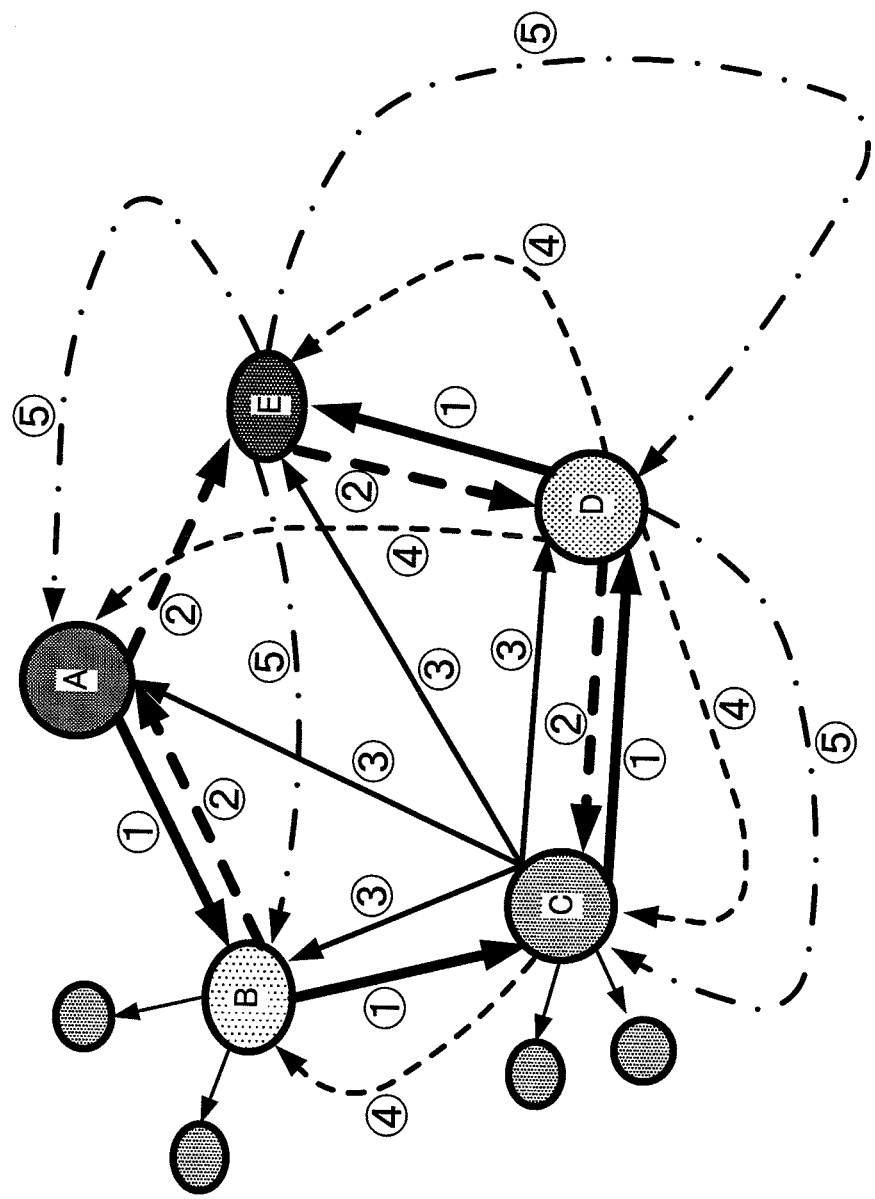
FIGS. 14A and 14B show routings in an explanatory case with five nodes according to the embodiment of the present invention.
Figure 14B:
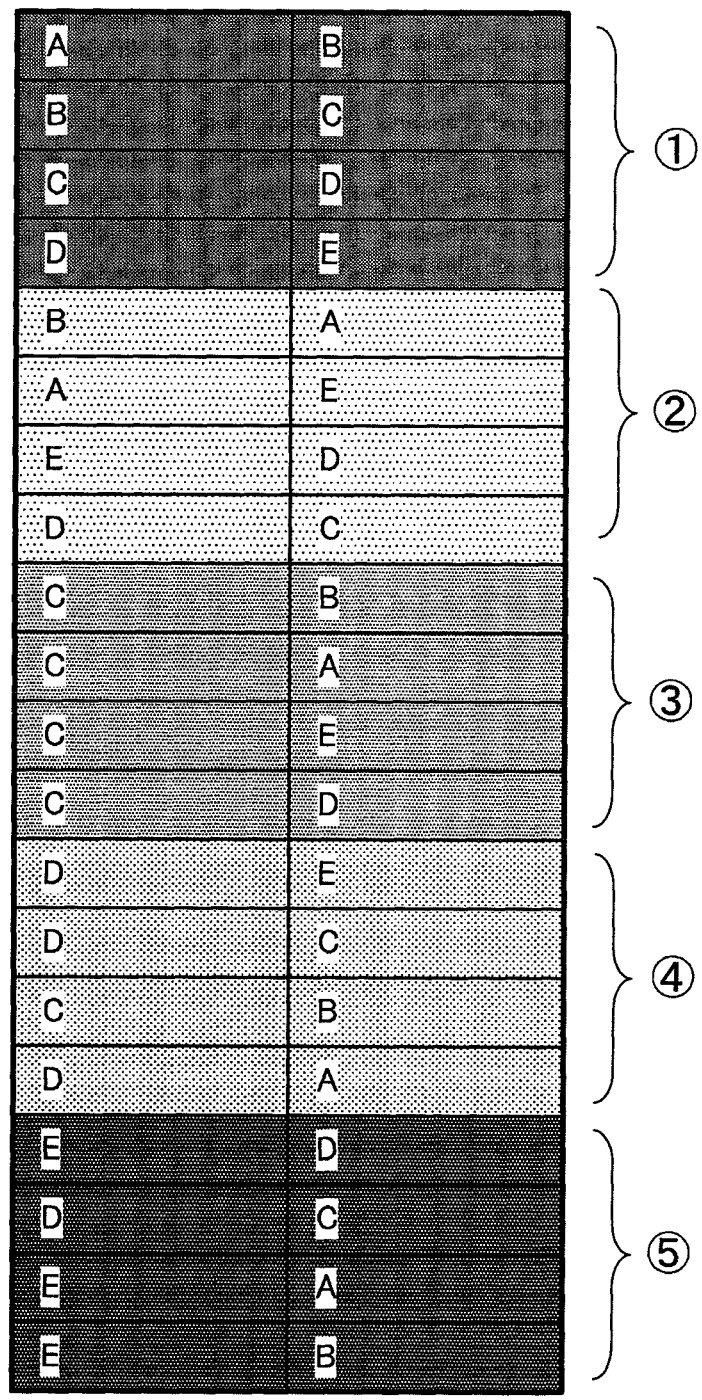
Figure 16A:
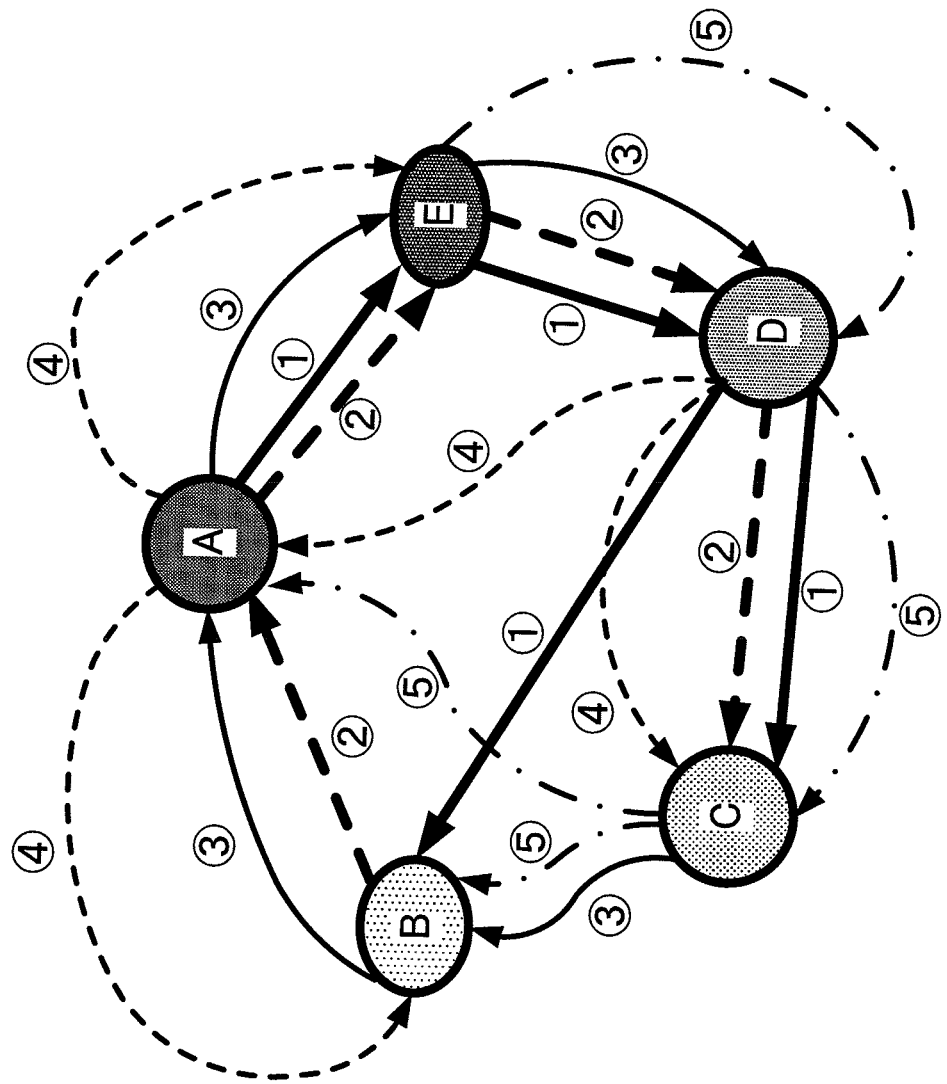
FIGS. 16A and 16B show routings in another explanatory case with five nodes according to the embodiment of the present invention.
Figure 16B:
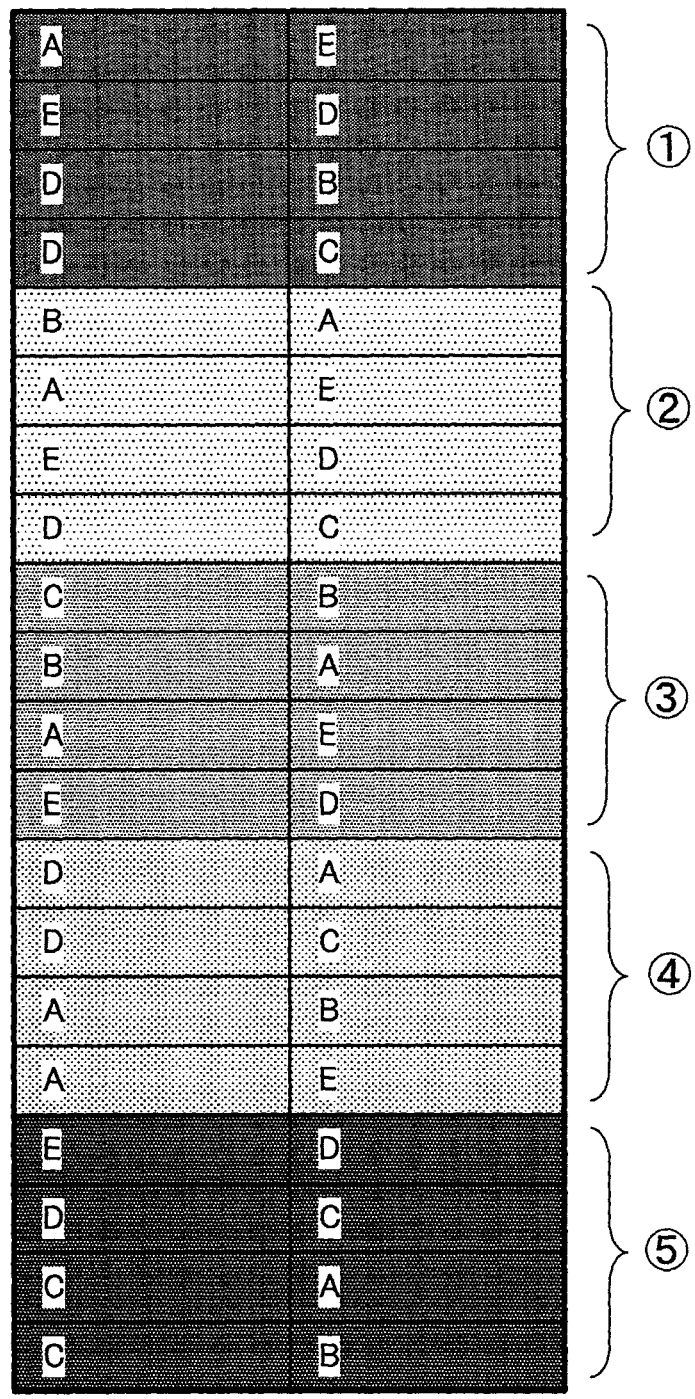

FIG. 14A and FIG. 16A illustrate transfer routes between nodes, FIG. 14B and FIG. 16B illustrate routing tables in the nodes, and FIGS. 15A-15E and FIGS. 17A-17E illustrate MHL tables prepared by nodes A-E, respectively. These figures are viewed in the same way as in the above example in the case of four nodes, and the hop lengths in FIGS. 15A-15E and FIGS. 17A-17E are defined by the routing tables in FIG. 14B and FIG. 16B, respectively.

As a result, for example, "Mixing Status" for the next destination nodes B and E at self node A in FIG. 15A is determined as "MF", which means that the mixing processing and the forwarding processing are performed, because there is no possibility that data of node A does not overlap even if mixing processing is performed. For the same reason, "Mixing Status" for the next destination node B at self node A in FIG. 17A is determined as "MF."

On the other hand, at the self node D in FIG. 15D, the hop length to the next destination node C from source nodes B, D and E are "3", "0" and "1", respectively. In this case, "Mixing Status" is determined as "F" according to the above rule (2) since there are a plurality of numerals other than 0, that is "3" and "1", in the column of the next destination node C. Accordingly, the contents of the source nodes B, D and E are not mixed at the self node D, and are forwarded to the next destination node C. For the same reason as above, "Mixing Status" for the next destination node C at the self node D in FIG. 17D and "Mixing Status" for the next destination node D at the self node E in FIG. 17E are also determined as "F" to perform forwarding processing without mixing.

According to this embodiment, even if the number of nodes increases more than four, it is possible to improve the channel use efficiency to a maximum extent while improving the degradation of communication quality due to the occurrence of echo on the receiving side.

Next, MHL table 700 will be initialized with "0" value for respective entries (column 704, row 716 through column 712, row 724 in FIG. 7) before starting the building process at step 1908 in FIG. 19. The process of filling-up MHL table 700 (at 1910) continues until all entries (row 624 through row 662) of "Tree Source" column 602 are walked through (at 1932). In other words, the MHL table construction completion step 1910 is verified by step 1932 in FIG. 19 by performing the following step. All entries of rows 624 to 662 of FIG. 6 are checked for all fields of "Tree Source" column 602. Starting from IP#A (Tree Source field 604), respective MHL table (see FIG. 7) entries will be made (at 1914). IP#A is made as an entry at column 702, row 716 of MHL table 700. Next, it moves to Source Address field of column 612 of the "Tree Source" (602) (at 1916). Staring from each "Source Address" entry in the AMF table 600 (at 1918) refer to its respective Next Destination Address field (at 1922). In the case of IP#A, the process starts with Source Address (Column 612, Row 624) and Destination Address (Column 620, Row 624). Similarly, for all Next Destination Address entries with respect to Source Address (at 1924), Hop Count from the source to destination address will be performed (at 1934). For example, the hop count between IP#A (Column 612, Row 624) to IP#B (Column 620, Row 624) is "0" since they are directly connected. However, IP#C (Column 620, Row 626) and IP#D (Column 620, Row 628) are "1" hop away from Source Address IP#A (Column 612, Row 624).

Next, this Hop Count information will be updated (at 1928) in the MHL table 700 for Next Destination Node Addresses (704, 706, 708, 710 and 712) with respective to each Tree Source Addresses. Based on the above example, IP#C and IP#D will have entry "1" in the respective entries (Column 716, Row 708 and Row 710). Upon completing MHL table construction, DAMS table 800 will be constructed (at 1930).

The DAMS table 800 is constructed by DAMS table generator 514 by accessing MHL table database 508 via link 522. The constructed DAMS table 800 is stored in DAMS table database 510 via link 524.

DAMS table construction starts upon completion of MHL table or updating of MHL table (at 2002). The process caters for all entries of "Destination Node Address" (704, 706, 708, 710 and 712) in MHL table 700 (at 2004) by inspection of each column (at 2008). If all entry values of "Next Destination Node Address" Row are "0" (at 2012), then the Mixing Status field (726) of MHL table 700 is marked as "X" indicating no next destination (at 2010) is exist (e.g., IP#B). If the non-zero entries are not same (at 2014) (e.g., combination of 1 or 2 or more), then Mixing Status field (726) of MHL table 700 is marked as "F" (e.g., IP#A) indicating ALM-MCU node forwards all its received content (at 2016). If the non-zero entries are same (e.g., all are "1" or all are "2" etc), then Mixing Status field (726) of MHL table 700 is marked as "M" (e.g., IP#C and IP#D) indicating ALM-MCU node mixes and forwards all its received content (at 2020).

Next, the MHL table entry "Leaf/Non-Leaf" field (728) needs to be edited either NL (Non-Leaf) or L (Leaf) for the specific "Next Destination". In the case of Mixing Status is "X" or "F", the "Leaf/Non-Leaf" field (728) will be edited as NL (Non-Leaf) (at 2024), otherwise in the case of "M" it will be L (Leaf) (at 2022).

The above process is continued until all "Destination Node Address" (704, 706, 708, 710 and 712) in MHL table 700 are covered (at 2018). Upon completion, DAMS table 800 (FIG. 8) will be updated, specifically for "Final Mixing Status" Column 808 (at 2026).

DAMS table 800 is used by the specific node (for example, Node B (308)) to decide on AV operation for each AV streams from different Tree Source (804) nodes. Thus, the DAMS table building node must self-identify before constructing its own DAMS table 800.

Next, own IP address is determined in order to determine self identity (802) (at 2028). This is done by referring to the nodes local network configuration file for its IP address or any other address representation. The DAMS table 800 is updated for each "Tree Source" column 602 of AMF table 600 with reference to DAMS table entry column 804. The operation is performed for all (at 2034) Self Node Address through last entry (at 2030), by referring to "Next Destination Node Address" (column 702) of MHL table 700 with reference to "Source Address" field (612) in AMF table 600 (806). The Mixing Status as in MHL table 700 (726) checked (at 2036) before making appropriate entry for DAMS table 800 (808).

If the mixing status is "X" (at 2046), then nothing need to be done to the AV content (at 2038). However, if the mixing status is "M" (at 2048), then mixing operation is required (at 2040), and other than those above, AV content will be forwarded to next destination (at 2044). The above steps are continued (at 2042 and 2052) until the last entry of "Tree Source" and "Next Destination Node Address" is reached in DAMS table 800 by each node for itself (at 2050). Upon completing the DAMS table construction, the AV packet processing can be carried out. In the case of Mixing Status "M" (at 2048), it is followed by Forwarding operation, and thus the Final Mixing Status column will be edited as "MF".

For example, assuming Node B is building its DAMS table 800, it needs to know its own IP address which is IP#B (802). With this assumption, it will refer to MHL table 700 for specific Tree Source Address, column 702. The process of building DAMS table 800 starts with reference to IP#A 716 entry and check for hop count entries at row 716. Since there are entries of "1" at IP#C (column 708, row 716) and IP#D (column 710, row 716), the DAMS table 800 will have IP#C and IP#D as Next Destination Address (806, 812 and 814) entries. The Final Mixing Status is marked as "MF" since the Mixing Status of MHL table 700 of entries (column 708, row 726) and (column 710, row 726) are "M" and based on FIG. 20 (at 2040, 2044), the mixed packets will be forwarded. The same steps are performed for all Tree Source (702) in FIG. 7.

The DAMS table update is an independent process compared to AV packet processing. AV packet processing is performed based on current state of DAMS table.

Upon receiving the trigger (at 2040) to perform AV mixing (at 2102), either mandatory (at 2104) or selective (at 2106) mixing will be carried out.

By referring to AMF table database 506 via link 516, mandatory mixing unit 532 mixes the incoming AV streams 550 received by routing engine 552 from other ALM-MCU nodes 556. ALM/Non-ALM selector unit 538 distinguishes ALM and Non-ALM streams. Mandatorily mixed contents are forwarded via link 536 to forwarding unit 554. On the other hand, ALM mixing unit 504 refers to MHL table database 508 and DAMS table database 510 via respective links 526 and 528 to mix AV streams either directly received from other ALM/end nodes 550 or from mandatory mixing unit 534.

Next, selective mixing unit 568, which comprises non-leaf stream selector unit 540 and leaf stream selector unit 544, separates the AV stream to be forwarded directly via link 542 or to be mixed by mixing unit 546 before being forwarded via link 548. Finally, forwarding unit 554 forwards all AV streams to routing engine 552 via link 560 to be forwarded to next destination 558 based on ALM table 600.

An apparatus which does the specific mixing operation is illustrated in FIG. 11 with reference to FIG. 3 example for Node B (designated by 308) ALM-MCU operation. The apparatus demonstrates a method applied to remove the looping problem while maintaining dynamic and selective mixing for decentralized ALM AV conferencing application at Node B. Mandatory mixing unit 1122 and selective mixing unit 1160 are same as in FIGS. 5, 532 and 568 respectively but illustrated in greater details.

As defined earlier, mandatory mixing states AV stream which must be mixed by an ALM-MCU node with reference to AMF table 600 only. Meanwhile, selective mixing states AV streams which are mixed by an ALM-MCU node based on DAMS table 800 and MHL table 700. These two mixing operations have different role. Mandatory mixing ensures leaf nodes get all AV streams mixed for itself except its content by the ALM node. Selective mixing on the other hand ensures AV streams from leave nodes are mixed and/or forwarded to the next node.

For example, in the case of Node B (designated by 308), it needs to ensure Node H gets all other AV packets except Node H itself (via link 1116). Similarly, the same holds for other leaf nodes if exist at Node B (via link 1118). Meanwhile, other AV content is needed to be forwarded to selective mixing unit 1160 (568) via link 1120.

AV streams are received from Node A (via link 1106), Node C (via link 1108), Node D (via link 1110), H (via link 1112) and other leaf nodes (via link 1114), if exist. Please refer to FIG. 3 for the nodes reference. All the AV streams are mapped to mixing unit 1104 based on ALM/Non-ALM selector 1138 input. FIG. 22 illustrates the key steps of mandatory mixing unit 1122 (532). Upon receiving trigger to mix (at 2202), AV packets from all channels/ports respective to Source Address 612 and Source Port Number 614 based on AMF table 600 stored in AMF table database 506 will be enabled for AV packet processing at Node B (at 2204, 2206). The reference to AMF table database 506 is done via link 1134 by ALM/Non-ALM selector 1138 to identify channel type 618 (at 2212).

If it is a non-ALM channel selector (at 2218 and 2216) (e.g., 1112 and 1114) for all non-ALM channels (at 2230), mix ALM and non-ALM (at 2234) input channels AV stream except own non-ALM (at 2236) input channels (e.g., operation of 1103 and 1117 for non-ALM channel H (via link 1116) and other leafs (via link 1118)). The mixed AV content is output at respective non-ALM channel/port 1116 and 1118 (at 2238). As for ALM channels selector (at 2214 and 2220), AV content of all non-ALM channels/input streams (at 2224) are mixed (at 2226 and 2223) and forwarded to selective mixing unit 1160 (568) (at 2228) via link 1120. The mixing of ALM and non-ALM AV content are performed for all input ports (at 2206 and 2210) based on AMF table input.

Next, selective mixing is performed (at 2302) by differentiating mandatory mixer stream via link 1120 and independent input streams via links 1106, 1108 and 1110 (at 2304) with steps illustrated in FIG. 23. This is followed by distinguishing leaf node/non-leaf node and MHL identification for selective mixing. MHL table database 508 and DAMS table database 510 will be accessed via link 1136 and link 1140 respectively by non-leaf stream selector 1126, leaf stream selector 1146 and MHL detector 1142 for the above-mentioned purpose at 2306. In DAMS table 800, Self Node Address 802 and Final Mixing Status 808 fields are referred (at 2308) while in MHL table 700 Leaf/Non-Leaf field 728 is referred (at 2310). Utilizing these fields information all leaf and non-lead mixing status will be identified (at 2312) by non-leaf stream selector 1126, leaf stream selector 1146 and MHL detector 1142 units. The Final Mixing Status field 808 in DAMS table 800 represents actual operation (do nothing, forwarding only, mixing and forwarding) undertaken before AV streams are forwarded to next node.

Next, based on leaf (at 2328 and 2318) and mixing status (at 2315), the following decision is made. If it is leaf node (at 2316) and mixing status (at 2328) is "M" (at 2332), then mixing operation is performed for input streams identified as "M" (808) in DAMS table respective to "Leaf" (728) nodes in MHL table 700 in "Leaf Stream Selector" unit (at 2336), else (at 2330) nothing is performed to the input stream (at 2334) and just forward AV content to respective output port (at 2338). If it is a non-leaf node (at 2314) and mixing status (at 2318) is "F" (at 2322), then forwarding operation is performed for input streams identified as "F" in DAMS table respective to "Non-Leaf" (728) nodes in MHL table in "Non-Leaf Stream Selector" unit (at 2326), else (2320) do nothing (2324). All the streams after mixing or without mixing are forwarded to respective output ports (at 2338).

With reference to FIG. 2, FIG. 3, FIG. 6, FIG. 7 and FIG. 8, AV content of Node A (302), Node C (306), and Node B (308) are forwarded without mixing at respective output ports 1150, 1152 and 1154. However, contents from Node A and Node B are mixed (at 1156) to be forwarded to Node C via output port 1158. The problem in FIG. 3, for example, is solved by this embodiment to mix only Node A's and Node B's contents since Node C will receive Node D's content independently. That is, in FIG. 3, Node B must have the knowledge that it should only mix content from Node A and its own Node B's content, and not mix content from Node D or Node C. This knowledge is contained in Node B's MHL table as shown in FIG. 13B in order to avoid any mixing problem.

The selective mixing operation based MHL and DAMS table solves the packet looping problem in an ALM based AV conferencing session, while dynamic ALM Table reference for AMF, MHL and DAMS table construction ensures continuous dynamism in the above mentioned solution.

What is claimed is:

1. A multicast communication apparatus for receiving and forwarding data via a network among a plurality of nodes, comprising:
   a receiver that receives the data from a source node;
   a memory that stores a routing table that includes route information of the data including the source node and a destination node of the data;
   a forwarder that forwards the data to a next destination node according to the route information of the routing table;
   a second memory that stores a hop length table that includes a hopping number of the data forwarded from the source node to the next destination node; and a mixing processor that performs mixing processing of data received from another node, wherein the mixing processor performs the mixing processing according to the hopping number in the hop length table.

2. The multicast communication apparatus according to claim 1, wherein:

the route information further includes a routing order of the data, and the hopping number is defined as a number of nodes between the source node and the next destination node.

3. The multicast communication apparatus according to claim 2, wherein the hop length table is created for each of the plurality of nodes and determines the hopping number regarding all combinations of the source node and the next destination node.

4. The multicast communication apparatus according to claim 3, wherein:

the hop length table comprises status information for each of next destination nodes as to whether to perform the mixing processing of the data, and the mixing processor performs the mixing processing according to the status information.

5. The multicast communication apparatus according to claim 4, wherein the forwarder performs forwarding processing without performing the mixing processing at the mixing processor for one of the next destination nodes when the status information for the one of the next destination nodes indicates to forward.

6. The multicast communication apparatus according to claim 5, wherein the status information for the one of the next destination nodes indicates to forward when there is a plurality of hopping numbers other than 0 for the one of the next destination nodes.

7. The multicast communication apparatus according to claim 6, wherein the mixing processor performs the mixing processing, and the forwarder forwards to the next destination node mixed data mixed at the mixing processor when the status information indicates to mix.

8. The multicast communication apparatus according to claim 7, wherein the data received at the receiver is replayed without the mixing processing and the forwarding processing when the status information indicates to replay.

9. A multicast communication method for receiving and forwarding data via a network among a plurality of nodes, comprising:

receiving data from a source node;

obtaining route information of the data including the source node and a destination node of the data;

forwarding the data to a next destination node according to the route information of the data;

creating a hop length table, at each of the plurality of nodes, that includes a hopping number of the data forwarded from the source node to the next destination node; and determining whether to mix the data received with other data based on the hopping number of the data in the hop length table.

10. The multicast communication method according to claim 9, wherein:

the route information further includes a routing order of the data, and the hopping number is defined as a number of nodes between the source node and the next destination node.

11. The multicast communication method according to claim 10, wherein the creating of the hop length table includes determining the hopping number regarding all combinations of the source node and the next destination node.

12. A multicast communication method for receiving and forwarding data via a network among a plurality of nodes according to route information including a source node and a destination node of the data, comprising:

receiving first data and second data at a first node;

forwarding the first data and the second data to a next destination node according to the route information; and determining whether to mix the first data with the second data at the first node based on a first hopping number of the first data and a second hopping number of the second data;

wherein the first hopping number of the first data is defined as a number of nodes between the source node of the first data and the next destination node of the first data, and the second hopping number of the second data is defined as a number of nodes between the source node of the second data and the next destination node of the second data.

13. The multicast communication method according to claim 12, wherein the determining of whether to mix the first data with the second data at the first node includes determining not to mix the first data with the second data at the first node when both the first hopping number and the second hopping number are greater than zero.

14. A non-transitory computer readable medium storing a program that, when executed by a computer, causes the computer to perform:

receiving data from a source node;

obtaining route information of the data including the source node and a destination node of the data;

forwarding the data to a next destination node according to the route information of the data;

creating a hop length table, at each of the plurality of nodes, that includes a hopping number of the data forwarded from the source node to the next destination node; and determining whether to mix the data received with other data based on the hopping number of the data in the hop length table.

15. A multicast communication apparatus for receiving and forwarding data via a network among a plurality of nodes, comprising:

a receiver that receives the data from a source node;

a forwarder that forwards the data to a next destination node;

a memory that stores a hop length table that includes a hopping number of the data forwarded from the source node to the next destination node; and a mixing processor that performs mixing processing of data received from another node, wherein the mixing processor performs the mixing processing according to the hopping number in the hop length table.

* * * * *